(12) United States Patent  
Saavedra

(10) Patent No.: US 9,212,653 B2  
(45) Date of Patent: Dec. 15, 2015

(54) POWER GENERATOR UTILIZING FLUID FLOW AROUND AN AIRFOIL

(71) Applicant: John A. Saavedra, Irmo, SC (US)

(72) Inventor: John A. Saavedra, Irmo, SC (US)

(*) Notice: Subject to any disclaimer, the term of this patent is extended or adjusted under 35 U.S.C. 154(b) by 0 days.

(21) Appl. No.: 14/468,489

(22) Filed: Aug. 26, 2014

(65) Prior Publication Data

US 2014/0367973 A1 Dec. 18, 2014

Related U.S. Application Data

(63) Continuation-in-part of application No. 14/031,201, filed on Sep. 19, 2013, now Pat. No. 8,896,145, and a continuation-in-part of application No. 13/678,770, filed on Nov. 16, 2012, now Pat. No. 8,742,614.

(51) Int. Cl.

| F03B 17/00 | (2006.01) |
|---|---|
| F03D 5/06 | (2006.01) |
| F03D 9/00 | (2006.01) |
| G09F 15/00 | (2006.01) |
| F03D 5/00 | (2006.01) |

(52) U.S. Cl.
CPC .. *F03D 5/06* (2013.01); *F03D 5/00* (2013.01); *F03D 9/002* (2013.01); *G09F 15/0087* (2013.01); *F05B 2260/406* (2013.01); *Y02E 10/70* (2013.01)

(58) Field of Classification Search
CPC .................................. F03B 13/00; F03D 1/02
USPC .......................................................... 290/55
See application file for complete search history.

(56) References Cited

U.S. PATENT DOCUMENTS

| 1,786,472 | A | * | 12/1930 | Yates ........................... 244/35 R |
|---|---|---|---|---|
| 3,876,925 | A | * | 4/1975 | Stoeckert ......................... 322/1 |
| 3,952,723 | A | * | 4/1976 | Browning ..................... 126/247 |
| 3,995,972 | A | * | 12/1976 | Nassar ............................ 416/68 |
| 4,915,584 | A | * | 4/1990 | Kashubara ...................... 416/64 |
| 6,273,680 | B1 | * | 8/2001 | Arnold ............................. 416/1 |
| 6,652,232 | B2 | * | 11/2003 | Bolduc .......................... 416/24 |
| 7,728,455 | B2 | * | 6/2010 | Branco .......................... 290/55 |
| 7,964,984 | B2 | | 6/2011 | Saavedra |
| 8,049,357 | B2 | | 11/2011 | Saavedra |
| 2006/0188364 | A1 | * | 8/2006 | Fritz ............................ 415/4.2 |
| 2010/0133850 | A1 | * | 6/2010 | Winkler ......................... 290/55 |
| 2012/0235417 | A1 | * | 9/2012 | Arntz ............................. 290/55 |
| 2013/0284273 | A1 | * | 10/2013 | Boespflug et al. .............. 137/13 |

FOREIGN PATENT DOCUMENTS

| EP | 1466090 B1 | 3/2007 |
|---|---|---|
| WO | 2012039688 A1 | 3/2012 |

* cited by examiner

*Primary Examiner* — Joseph Waks

(74) *Attorney, Agent, or Firm* — Shumaker, Loop & Kendrick, LLP

(57) ABSTRACT

A power generating apparatus may use fluid flow which may include intermittent fluid flow. Such a power generating apparatus may harness electric power from intermittent wind sources but may also be deployed in near constant winds. The apparatus includes airfoils that are pivotally attached to vertical supports. The supports are attached to power generating devices. As wind blows, the airfoils lift upward relative to the horizontal. The motion may be transferred by actuating a hydraulic cylinder. This motion pressurizes the cylinder and the pressurized hydraulic fluid may later be transferred into electric power via a hydraulic generator. The upward motion may also be transferred to a permanent magnet alternator.

30 Claims, 22 Drawing Sheets

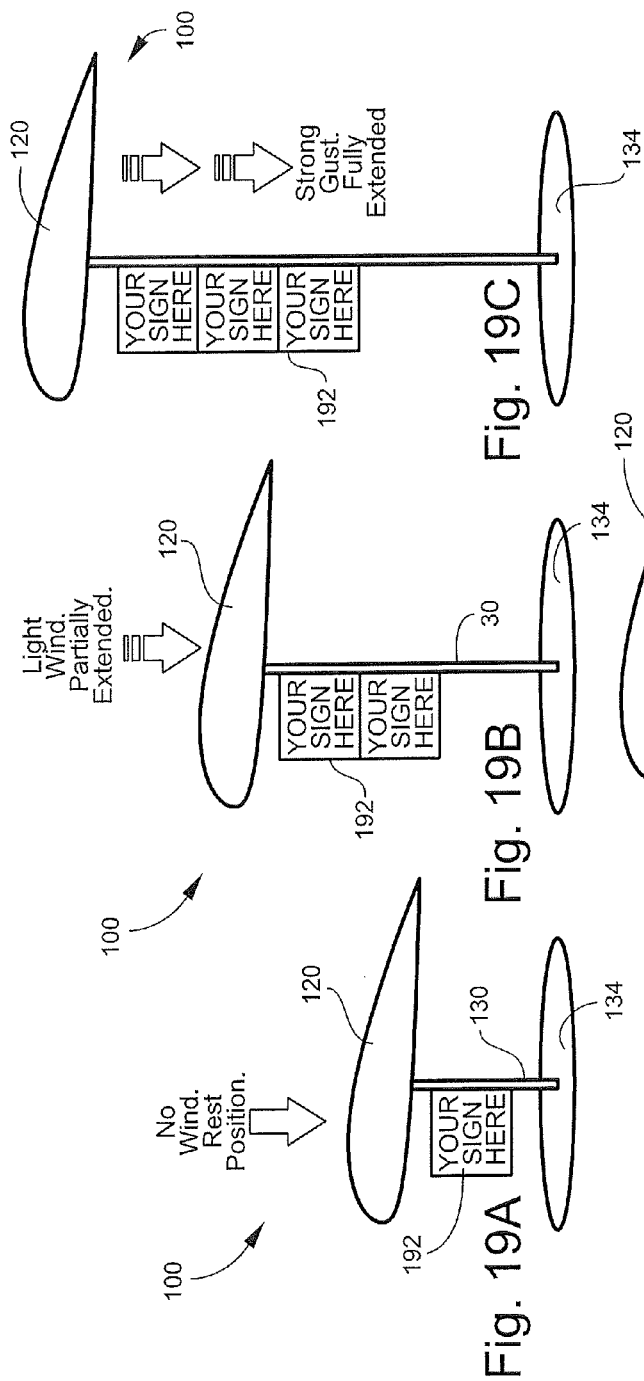

POWER GENERATOR UTILIZING FLUID FLOW AROUND AN AIRFOIL

CROSS REFERENCE TO RELATED PATENT APPLICATIONS

This application is a continuation-in-part of, expressly incorporates by reference, and claims the benefit of and priority to co-pending U.S. application having Ser. No. 14/031,201 filed on Sep. 19, 2013 which is a continuation-in-part of U.S. application having Ser. No. 13/678,770 filed on Nov. 16, 2012, now U.S. Pat. No. 8,742,614. This application, likewise, expressly incorporates by reference, and claims the benefit of and priority to U.S. application having Ser. No. 13/678,770 filed on Nov. 16, 2012, now U.S. Pat. No. 8,742,614.

TECHNICAL FIELD AND BACKGROUND OF INVENTION

The invention relates generally to the field of power generation. More particularly, the invention relates to the field of generating power from fluid flows which may be constant, nearly constant, intermittent, variable, gusty wind or other fluids around an airfoil.

For centuries, wind has been used to power windmills and wind turbines. Typical wind-energy systems are placed in locations known to have consistent natural winds. A typical windmill has a blade assembly that executes full rotations on an axis that is horizontal. Such systems are suited for harnessing the energy of consistently directional winds. They are not well suited for harnessing the energy of intermittent, spurious, or gusty winds. Winds at ground level are considered too intermittent for use in conventional turbines. Terrain, buildings, houses, traffic, and other variables tend to disturb prevailing winds, and are considered detrimental to capturing the energy in wind flows, generally more stable above the immediate surface of the Earth.

The total surface area of a typical windmill and wind turbine is also relatively small. Long and complex blades constructed of expensive materials are developed to turn rapidly in hill top and sea side locations where strong winds are present. Tall and expensive towers are needed to elevate the blades to safely permit full rotation and to reach wind patterns far above the ground.

Typical windmills often kill bats and birds, especially migratory birds, and they generate unwelcome noise. They disrupt skylines and viewing vistas for which people have paid good money. Further, typical wind turbines are limited in high winds because they have to be shut down in high winds to prevent their own damage.

Thus, typical systems for collecting energy from wind are not suited for use by individuals and small businesses and others who could collect wind energy at ground level. Likewise, they are not suited for use by the one in four people on Earth who currently live away from and are not connect to any electrical grid. A typical wind-energy system has a large structure that is difficult to disassemble and move, and is therefore not suited for transportation and relocation. However, electric utility companies give credit for any electricity a customer produces through a process known as net metering, and so an incentive is in place for even individuals to enter the power producing arena.

Importantly, typical available wind-energy systems are not suited for harnessing the energy of ground level winds despite that great energy resources are available at low altitudes. For example, the air movements created by passing vehicles along roadways represent an unused energy resource. Another example is air movements created by aircraft that land and take off from airports. Further, such examples include intermittent wind at the rooftop level of buildings and other structures such as sports arenas or even petroleum and diesel refilling stations.

Therefore, there is a need for an improved power generator utilizing intermittent winds as well as sustained winds.

SUMMARY OF THE INVENTION

It is an object of the present invention to provide a power generator that uses intermittent fluid flow such as intermittent wind, intermittent water waves, and intermittent water current flow. The basis for some of the embodiments of the invention is that an intermittent, gusty, variable fluid flow that is generally horizontal raises a planar surface upon contact. The planar surface may be mounted substantially horizontally and then raised in a vertical direction. The planar surface is generally rectangular in shape and may be hinged on one side, away from the oncoming fluid flow. When no fluid is flowing, the planar surface rests. It may rest in a substantially horizontal position.

As the fluid flow increases, the planar panel begins to rise above the horizontal. As the fluid flow continues to increase, the planar surface is raised higher and higher above the horizontal or rest position. With these concepts in mind, the following is a summary and description of the invention which uses the term "wind" to refer to such fluid flows. However, this reference is not intended to unduly limit the invention to movements of air comprising wind and indeed the invention encompasses other similar fluid flows.

These and other aspects of one embodiment of the invention are achieved by providing a power generating apparatus adapted for utilizing intermittent fluid flow including a panel having only one side adapted for receiving intermittent gusty winds. The panel has a pivotal attachment mounted to a frame supporting the panel such that upon intermittent winds contacting the side of the panel adapted for receiving intermittent gusty winds, the panel pivots upward, from a rest position that is at an acute angle relative to a horizontal ground. In such a way, the panel will pivot upward in a direction away from the horizontal towards a substantially vertical position. Further, in the absence of intermittent wind, after the panel has pivoted upward, the panel returns to the rest position.

According to another aspect of one embodiment of the invention, the power generating apparatus includes a return spring adapted to maintain the panel in the rest position at the acute angle to the horizontal in the absence of the intermittent gusty wind, to stop the panel from exceeding the substantially vertical position in the presence of the intermittent gusty wind, and to return the panel to the rest position when the intermittent gusty wind is no longer present. The power generating apparatus further includes a power generator carried by the frame and adapted to actuate when the panel moves from the rest position in response to the intermittent gusty wind such that power is generated for use by a power consuming, a power storing, or a power transmitting device.

According to another aspect of an embodiment of the invention, the power generating apparatus includes a stationary support to maintain the panel in the rest position at the acute angle to the horizontal in the absence of intermittent gusty wind. The invention may also include a stationary backstop to limit movement of the panel from moving beyond the vertical position in the presence of wind.

According to another aspect of an embodiment of the invention, the acute angle of the rest position that is maintained by the return spring is less than 10 degrees above the horizontal and the apparatus further comprises an airfoil or other wind lifting device attached to another surface of the panel on a side of the panel opposite the side adapted for receiving intermittent gusty winds. The airfoil is adapted to aid in initially lifting the panel from the rest position.

According to another aspect of an embodiment of the invention, the acute angle of the rest position that is maintained by the return spring is greater than 30 degrees above the horizontal and less than 60 degrees above the horizontal. Preferably, the acute angle is approximately 45 degrees in an embodiment where the panel is not substantially horizontal.

According to another aspect of an embodiment of the invention, the return spring includes two return springs with one that limits the panel to the 90 degree angle and another to keep the panel in the rest position of nearly horizontal or at an acute angle.

According to another aspect of an embodiment of the invention, the power generator comprises a shaft attached to the panel at the pivot connection to the frame where the shaft is also operably connected to a permanent-magnet alternator that generates electrical power as the shaft rotates, the shaft rotating as the panel moves from the rest position.

According to another aspect of an embodiment of the invention, the power generator further comprises a connector rod attached to a leading edge of the panel that is opposite the pivotal attachment to the frame. This connector rod is also connected to a flywheel attached to a crankshaft that is operably connected to a permanent-magnet alternator. The permanent-magnet alternator generates electrical power as the shaft rotates. The shaft rotates as the connector rod moves upward relative to the horizontal ground in response to the panel pivoting from the rest position.

According to another aspect of an embodiment of the invention, the power generator further comprises a connector rod attached to a leading edge of the panel. The leading edge of the panel is opposite the pivotal attachment to the frame. The connector rod is operably attached to a hydraulic cylinder or a plurality of hydraulic cylinders which store a quantity of hydraulic fluid under pressure in an accumulator reservoir as the connector rod moves upward relative to the horizontal ground in response to the panel pivoting from the rest position.

According to another aspect of an embodiment of the invention, the hydraulic cylinder or hydraulic cylinders are attached to a hydraulic electrical generator wherein the quantity of hydraulic fluid is released to power the hydraulic electrical generator when an optimum pressure level is achieved.

According to another aspect of an embodiment of the invention, a rotating wind vane is attached to the frame that rotates the frame to optimize the force of the intermittent gusty wind against the panel. The wind vane may be operably attached to a servo-motor that drives a turntable.

According to another aspect of an embodiment of the invention, advertising indicia are displayed on the panels.

According to another aspect of an embodiment of the invention, the power generating apparatus is located adjacent to an automobile roadway, an airport runway, or a train track.

According to another aspect of an embodiment of the invention, the power generating apparatus is located behind and downstream from other horizontal axis windmills and wind turbines such as prop driven turbines.

According to another embodiment of the invention, a power generating apparatus adapted for utilizing intermittent gusty winds includes an inclined track fixed to a frame in an upward sloping direction that is at an acute angle to a horizontal portion of ground. The power generating apparatus has a panel having only one side adapted for receiving intermittent gusty winds. The apparatus may include one or more panels. The panel is slidingly attached to the track and is positioned in a substantially vertical position relative to the horizontal ground with the side adapted for receiving intermittent gusty winds positioned to face substantially opposite the upward sloping direction. The panel operates from a rest position at a bottom of the track to an operating position that is displaced from the bottom of the track.

According to another aspect of an embodiment of the invention, the track may be horizontal rather than inclined and may utilize a return spring to return the panel to rest after intermittent gusty fluid ceases to flow.

According to another aspect of an embodiment of the invention, a connector rod is attached to the panel in a substantially horizontal position relative to the ground. A hydraulic cylinder is attached to the connector rod and to the frame and the hydraulic cylinder stores a quantity of hydraulic fluid under pressure. When the intermittent gusty winds drive the panel up the inclined track, the connector rod moves and thus compresses the hydraulic cylinder.

According to another aspect of an embodiment of the invention, a connector rod is attached to the panel in a position that is substantially parallel to the incline of the inclined track.

According to another aspect of an embodiment of the invention, the frame is fixed to a building structure and the panels further include advertising indicia attached thereto. The building structure could be a roof top, a sports arena, or the top of a fuel refilling station. Other such building structures are contemplated by the invention.

According to another aspect of an embodiment of the invention, a pair of sprag clutches may be mounted on the shaft in opposite orientations. Mounting the sprag clutches in this way may turn the motion of one shaft into the motion of two shafts, one turning clockwise only and the other turning counter-clockwise only.

According to another aspect of an embodiment of the invention, electric generators and/or hydraulic cylinders are attached to also capture the energy as the panel returns to a resting position as a result of gravity pulling the panel back from where wind had driven it.

According to another embodiment of the invention, the apparatus may be positioned so that the panel hangs roughly vertically to the horizontal ground. In such an embodiment, the apparatus may include a frame having a vertical post extending vertically from the horizontal ground and an upper support member that is roughly parallel to horizontal ground and is attached to the post at an upper extent of the post. The apparatus of this embodiment may include a panel having two sides adapted for receiving intermittent gusty winds. The panel may have a pivotal attachment mounted to the upper support member supporting the panel such that upon intermittent winds contacting either side of the panel adapted for receiving intermittent gusty winds, the panel pivots outward at a pivot angle, from a rest position that is roughly vertical relative to the horizontal ground, in a direction away from the vertical towards a horizontal position. In the absence of intermittent wind the panel returns to the rest position. The apparatus may include a power generator carried by the frame and adapted to actuate when the panel pivots from the rest position to an operating position in response to the intermittent gusty wind such that power is generated for use by a power consuming, a power storing, or a power transmitting device. The power generator carried by the frame limits the pivot angle of the panel in the operating position to a pre-specified acute angle.

According to another aspect of the vertical embodiment, the power generator carried by the frame may include a connector rod attached to a leading edge of the panel that is opposite the pivotal attachment to the frame. The connector rod is operably attached to a hydraulic cylinder or a plurality of hydraulic cylinders which store a quantity of hydraulic fluid under pressure in an accumulator reservoir as the connector rod moves outward relative to the vertical post in response to the panel pivoting from the rest position.

According to another aspect of the vertical embodiment, the hydraulic cylinder or hydraulic cylinders are attached to a hydraulic electrical generator and wherein the quantity of hydraulic fluid is released to power the hydraulic electrical generator when an optimum pressure level is achieved.

According to another aspect of the vertical embodiment a rotating wind vane is attached to the frame that rotates the frame to optimize the force of the intermittent gusty wind against the panel.

According to another aspect of the vertical embodiment, the apparatus may include advertising indicia displayed on the panels.

According to another aspect of the vertical embodiment, the apparatus may be located adjacent to an automobile roadway, an airport runway, or a train track.

According to another aspect of the apparatus, at least one side of the panel adapted for receiving gusty winds may include a plurality of photovoltaic cells adapted for converting light energy directly into electricity.

According to another aspect of the apparatus, both sides of the panel adapted for receiving gusty winds may include a plurality of photovoltaic cells adapted for converting light energy directly into electricity.

According to another embodiment of the invention, the planar surface thus described may be replaced with a rigid airfoil. Airfoils have been utilized in the art of airplane and boat design for wings, blades, and sails. An airfoil-shaped body moved through a fluid produces an aerodynamic force. The component of this force that is perpendicular to the direction of motion and is called lift. Because the air pressure above the airfoil is less than the air pressure below, the air exerts a net upward force on the airfoil. As presently described, the airfoil is fixed to the ground by supports, such as telescoping supports, and is not an "airfoil kite" of the type attached to tethers.

Airfoils have a characteristic shape with a rounded leading edge, followed by a sharp trailing edge, often with asymmetric curvature of upper and lower surfaces. Foils of similar function designed with water as the working fluid are called hydrofoils. As used herein, the term airfoil will be inclusive of the term hydrofoil to the extent an embodiment is designed to be used underwater or other liquid fluid. The general shape of the airfoils of the present invention are described and shown in the drawings but are not ultimately limiting of the shape of the airfoil itself. Rather, the invention contemplates a shaped airfoil designed to maximize lift on the airfoil for a given area of deployment. Thus, the ultimate parameters of the airfoil shape may be customized for a given location. For instance, the airfoil may have one shape in an area of constant fluid flow, another shape in an area of strong gusty winds, and another shape in an area with moderate gusty winds.

According to the airfoil embodiment, airfoils may be mounted on one or more vertical supports that allow vertical movement of the airfoil in response to intermittent gusty winds. In response to intermittent gusty winds, the airfoil will move upwards relative the horizontal resulting in lift. As the gusty fluid flows, the airfoil moves from a rest position to an elevated position. At a highest elevated position, the vertical support is at its furthest extent and the airfoil at its highest desired position relative the horizontal ground.

According to another embodiment of the airfoil embodiment, the vertical supports may be mounted on a base. The base may be a turntable, with a vane, to insure the airfoil faces squarely into the wind. One or more airfoils may be mounted one or more vertical supports. The vertical supports may be hingedly attached to the base and may be hingedly attached to the airfoil.

According to another embodiment of the airfoil embodiment, the airfoil may have a spring return attached to it and to the vertical support and/or the base. The spring return may supply a force, in addition to gravity, to bias the airfoil in the rest position when no fluid is flowing around the airfoil.

According to another embodiment, advertising indicia may be attached to the vertical support. As such, as the airfoil rises, the advertising indicia will rise. The advertising indicia may be hidden when the airfoil is at rest and only become visible upon rising or the advertising indicia may be visible at all times. Or, some advertising may be visible at rest and further additional advertising indicia may become visible as the airfoil rises.

Energy is generated from the lift of the airfoil. According to one embodiment of the invention, the energy may be captured by the rise and/or the fall of the airfoil by a hydraulic cylinder which charges a hydraulic accumulator which, in turn, powers a hydraulic generator.

According to another embodiment, as the airfoil rises and falls, it turns cranks and converts the up and down motion to rotary motion. The movement of the cranks may be used to drive conventional mechanical permanent magnet alternators. Additionally, sprag clutches or ratchets and pawls can be utilized along with transmissions to drive alternator shafts. Sprag clutches and ratchets and pawls may be used to convert back-and-forth rotations of a shaft to one-directional movement of either one or two shafts, then to drive alternator shafts.

According to another embodiment, both hydraulic generator systems and conventional mechanical permanent magnet alternators may be utilized to optimize energy harvested from the airfoil's lift.

According to another embodiment, the vertical supports may be angled relative the horizontal ground and may be telescoping in design to extend and retract as the airfoil rises and falls in response to intermittent gusty wind.

According to another aspect of the airfoil embodiment of the invention, the airfoil cycles through a power cycle. The power cycle includes the airfoil lifting upward from the rest position. The airfoil continues to lift until it reaches approximately 18 degrees from the horizontal at which point it stalls and the lift goes to zero. The entire airfoil panel falls and returns to the rest position at which point, in the presence of wind, the cycle repeats. This cycle occurs even in a constant flow of wind.

According to another embodiment, the airfoil includes a second smaller airfoil extending on the underside of the airfoil in an opposite orientation. As the airfoil angle increases relative the horizontal and approaches 18 degrees, the second smaller airfoil may force the lower side of the larger airfoil to begin to move upward. The lifting force on the second smaller airfoil may keep the airfoil from moving past the 18 degree point.

According to another embodiment, a fixed, rigid shroud may be configured to physically interrupt the fluid flow as the airfoil approaches 18 degrees. As fluid flow is interrupted, lift decreases and the airfoil starts to fall by the force of gravity or attached spring and thus complete the power cycle.

According to another embodiment, a horizontal stabilizer may be utilized to keep the airfoil below 18 degrees.

According to another embodiment, a mechanical shroud may be raised with the airfoil which would reduce resistance to the fluid flow. According to this embodiment, as the airfoil rises, it lowers a lever causing a shroud to fall estopping rise of the airfoil beyond the 18 degree desired limit.

According to another embodiment of the invention, the airfoil may have a surface of photovoltaic cells thereby harvesting both wind and solar energy.

According to another embodiment of the invention, the base may be attached to a vehicle such as an automobile or train.

According to another embodiment of the invention, the base may be attached to the roof of a building.

According to another embodiment of the invention, the base may be fixed to the seabed or river bed of a body of water.

According to another embodiment of the invention, the power generating apparatus may include a planar airfoil having a long end and a short end, the long end having an upper surface adapted for contacting fluid flow and the short end having an attached weight. It may also include a mast having a pivotal attachment to the planar airfoil at a point between the long end and the short end that is nearer the short end than the long end. It may further include power generator operably connected to the planar airfoil. According to such an embodiment, the planar airfoil is biased in a rest position with the long end extending generally upward relative to horizontal ground and the short end extending generally downward relative to horizontal ground such that upon impact of the fluid flow with the long end, the long end moves downward from the rest position to an operating position, pivoting about the pivotal attachment, and the short end moves upward from the rest position.

According to another embodiment utilizing a planar airfoil, the power generating apparatus may be positioned downstream from a horizontal axis wind turbine.

BRIEF DESCRIPTION OF THE DRAWINGS FIGURES

Features, aspects, and advantages of a preferred embodiment of the invention are better understood when the detailed description is read with reference to the accompanying drawing, in which:

FIG. 19A is a side view of the airfoil embodiment of the invention illustrating the airfoil in the rest position in the presence of no wind;

FIG. 19B is a side view of the airfoil embodiment of the invention illustrating the airfoil in an intermediate position in the presence of some light wind;

FIG. 19C is a side view of the airfoil embodiment of the invention illustrating the airfoil in the fully extended position in the presence of strong wind;

FIG. 20 is a side view of the airfoil embodiment of the invention illustrating the airfoil attached to a turntable and wind vane;

FIG. 25 is a top view of the planar airfoil embodiment of the invention; and.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Figure 1:
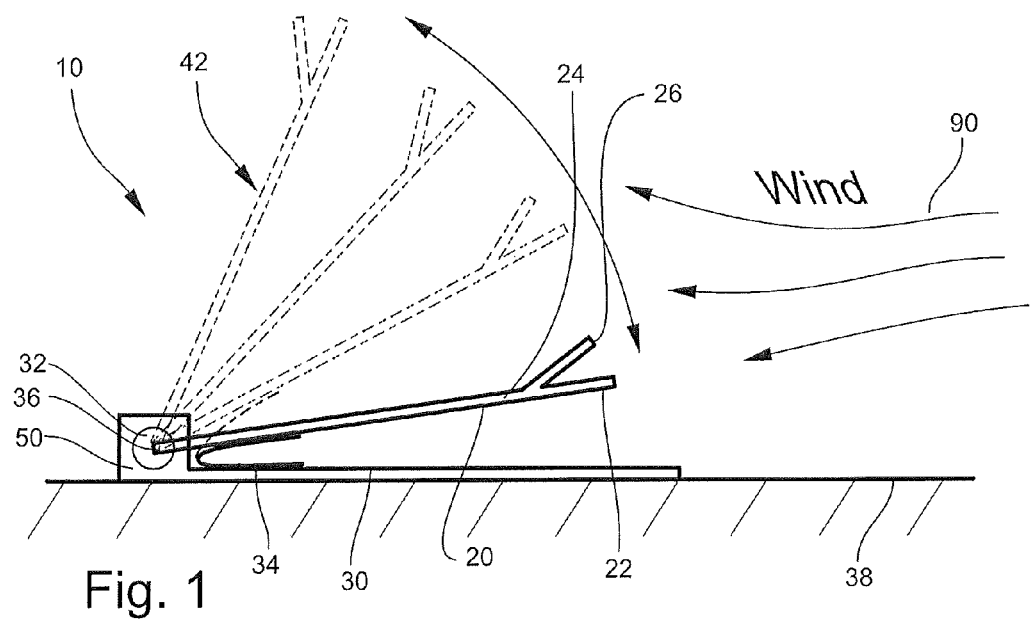
FIG. 1 is a side view of an embodiment of the apparatus having the panel at rest in a nearly horizontal position and highlighting how wind can lift the panel.
Figure 2:
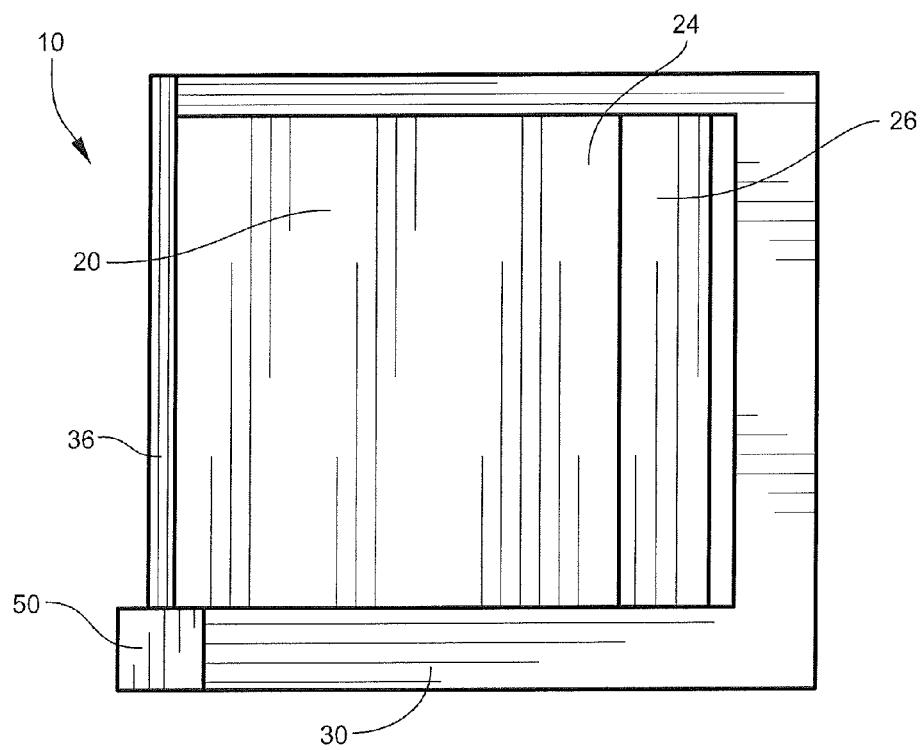
FIG. 2 is a top view of the embodiment of the apparatus of FIG. 1 showing the permanent magnetic alternator operably attached.
Figure 3:
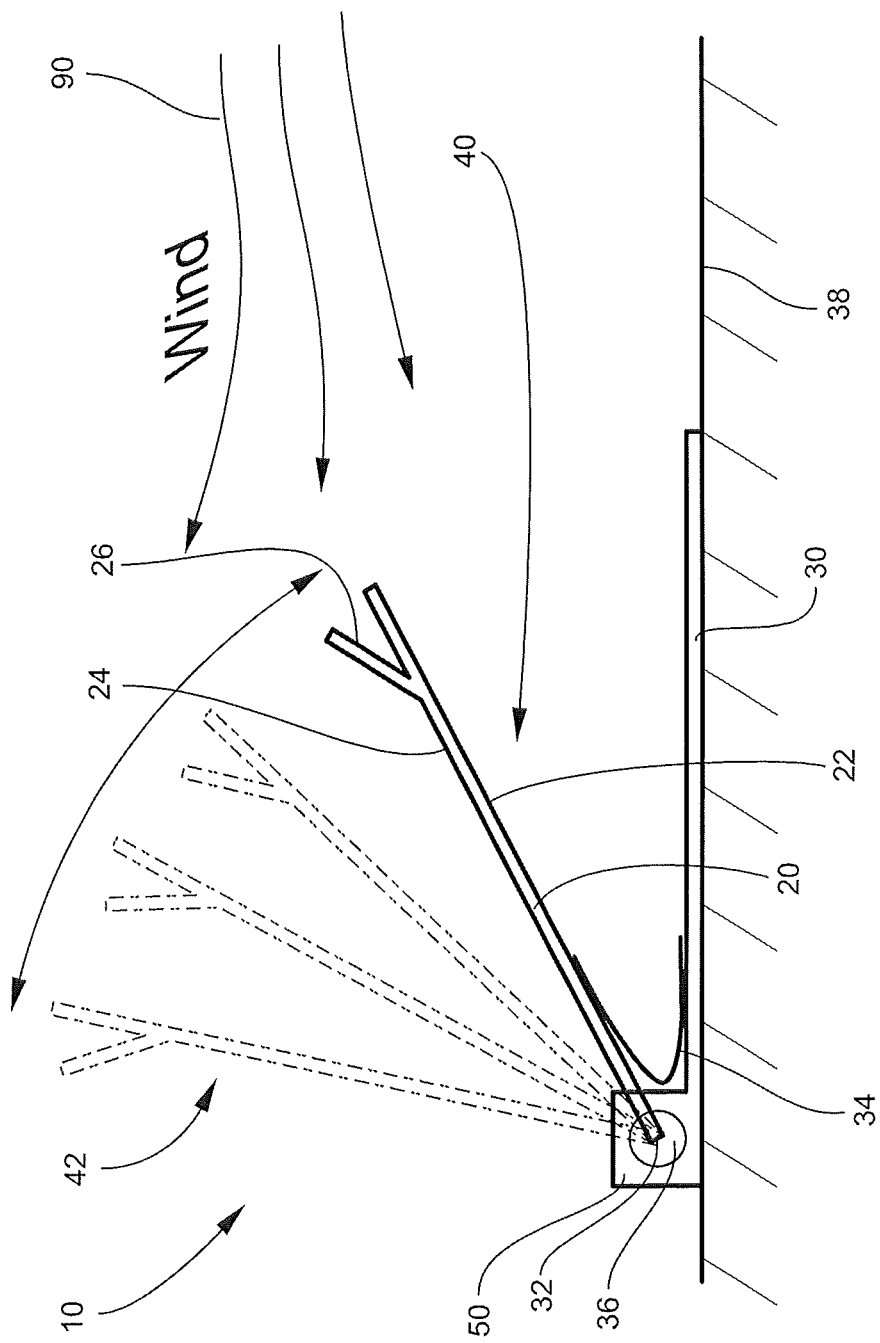
FIG. 3 is a side view of an embodiment of the apparatus having the panel at rest at an angle acute to the horizontal and highlighting how wind can lift the panel.
Figure 10:
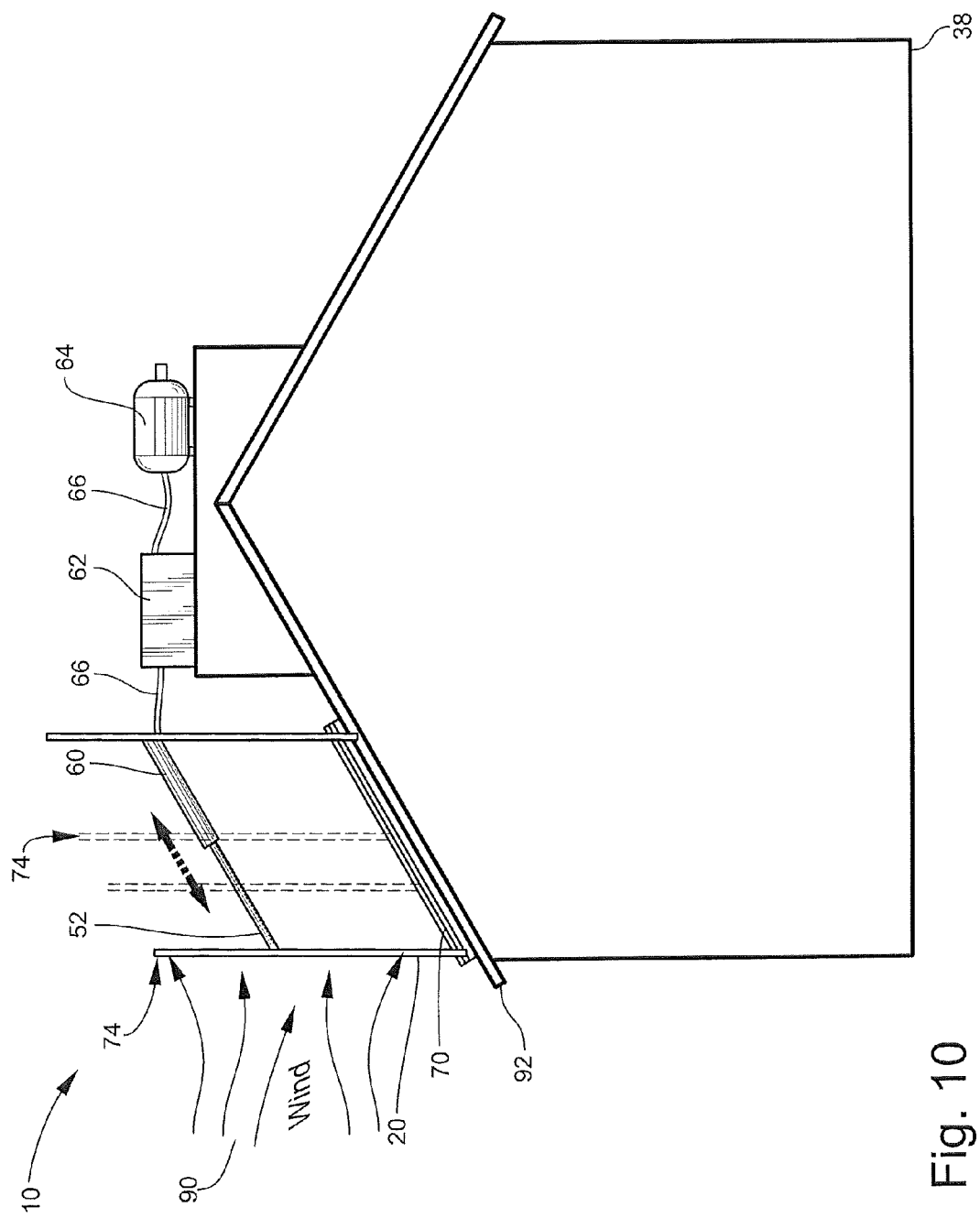
FIG. 10 is a side view of the embodiment of the apparatus of FIG. 8 highlighting how the apparatus may be installed on a rooftop.

Referring to the drawings wherein identical reference numerals denote the same elements throughout the various views, FIGS. 1, 2, 3, 6, and illustrate a power generating apparatus 10 according to one embodiment of the present invention. The power generating apparatus 10 is adapted for utilizing intermittent winds 90 and can be positioned in a variety of locations where winds are present, for instance, on a rooftop 92 as shown in FIG. 10. The power generating apparatus 10 includes a panel 20 having only one side 22 adapted for receiving intermittent gusty winds 90. The panel 20 is pivotally 32 attached to a frame 30 supporting the panel 20. In one embodiment, as shown in FIG. 1, the panel 20 pivots from a resting position at 10 degrees or less above the horizontal to a generally vertical position 42 when maximum wind force 90 is applied. In this embodiment, the panel 20 may have an airfoil 26, or other lifting device, attached to the panel 20 to aid in initially lifting the panel 20. The airfoil 26 is attached to a side of the panel 24 that is opposite the side 22 adapted for receiving intermittent gusty winds 90. In another embodiment, as shown in FIG. 3, the panel 20 pivots from a rest position 40 between 30 degrees and 60 degrees above the horizontal to a generally vertical position 42 when maximum wind force 90 is applied. Such an embodiment may not have an airfoil 26.

When the wind 90 contacting the panel 20 has passed or substantially lessens in strength, the panel 20 returns to the resting position 40 from the vertical or operating position 42. The panel 20 is biased by gravity and by a spring 34 toward the resting position 40. The spring 34 further functions keep the panel 20 from being completely horizontal and also may function as a stop to keep the panel from moving beyond the operating position 42.

The panel 20 may be made from any suitable material that can withstand the environment where it is to be deployed. In the illustrated example, the panel is made from plastic but other suitable materials can be used. The panel 20 is preferably rigid or at least somewhat rigid so that it transfers fluid motions to the shaft 36 as described below. The panel 20 may be made from a less rigid material such as a fabric that operates in a rigid panel 20 frame. The spring 34 is typically a metal having spring properties and may be a flat metal or may have coils.

The hinge pin, shaft, or axle 36 of the pivotal point of attachment may be operably attached to a power generator 50. This shaft 36 is pivotally mounted on the frame 30 such as through hinges, which permit pivoting of the panel 20 and the shaft 36. Various gear combinations known in the art may be utilized to optimally drive an electric current generator 50. Those of skill in the art will recognize that various gear, wheel, pulley, belts, chains, and cam arrangements attached to the axle 36 may be implemented to improve and optimize the power transferred from the rotating axle 36 to electric current generator 50. The actual energy produced is dependent in large degree on the size or mass of the planar surface of the panel 20, which is not limited by the drawings or descriptions here.

The electrical current generator 50 can be a permanent-magnetic alternator or other suitable current generating devices. The electrical current generators 50 may include resistors and capacitors adapted to convert AC currents to DC currents, or they may include rectifiers to convert AC currents to DC currents.

In the illustrated example of the power generating apparatus 10, one electrical power generator 50 is shown. However, any number of electrical power generators 50 could be used. In another example, two or three electrical power generators 50 are used. In other examples, ten and more electrical power generators 50 are used. This power can be used to charge batteries, to power equipment, or can be tied to an electric power grid.

Figure 11:
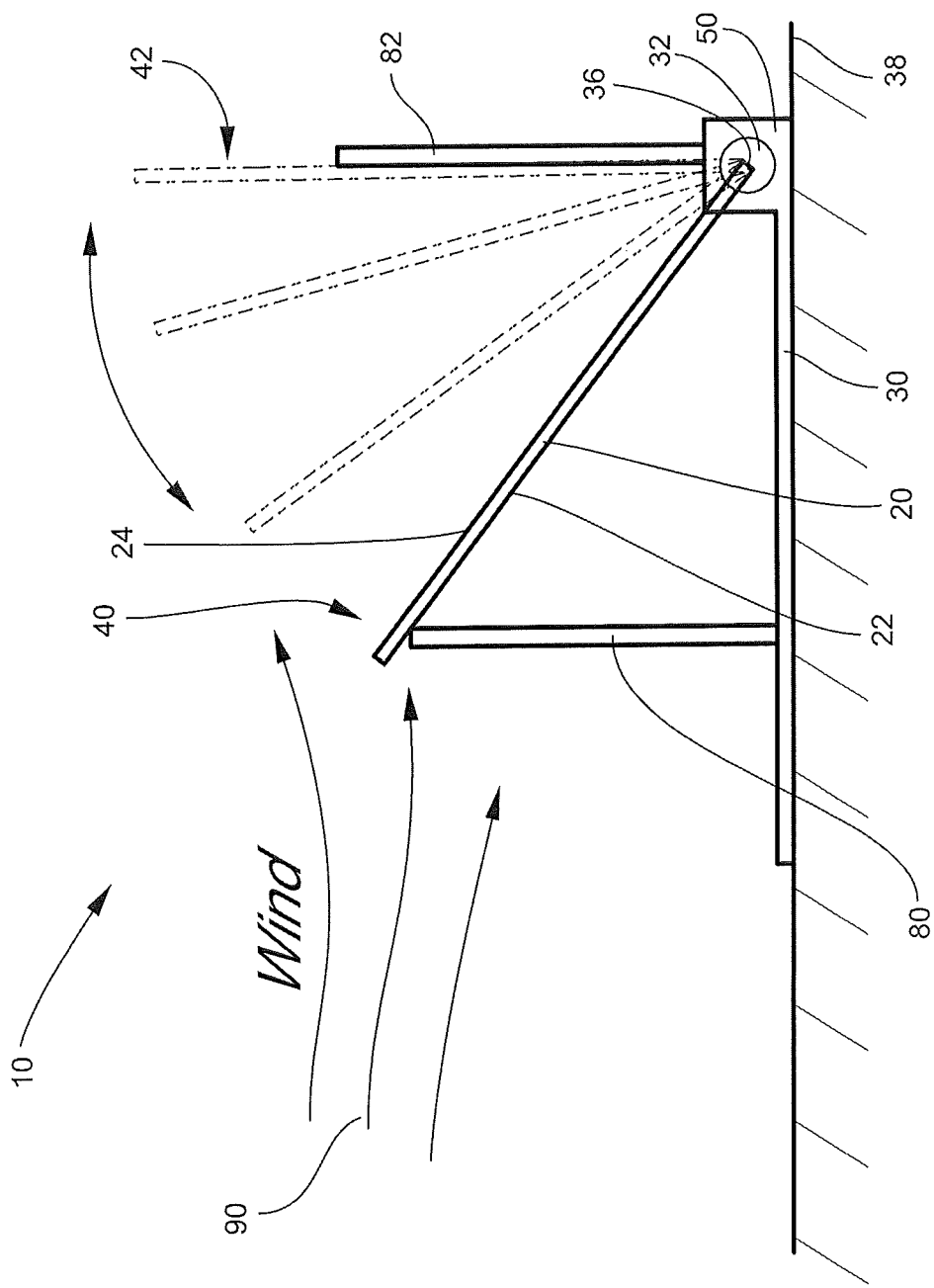
FIG. 11 is a side view of an embodiment of the apparatus having the panel at rest on a stationary vertical support and at its maximum also on a different stationary support.

In another embodiment of the invention shown in FIG. 11, rather than a spring, the invention may utilize a stationary vertical support 80 to support the panel 20 above the horizontal 38 when in the rest position 40. This embodiment may also utilize a stationary vertical back stop 82 to stop the panel 20 from exceeding the vertical while in the operating position 42.

Figure 15:
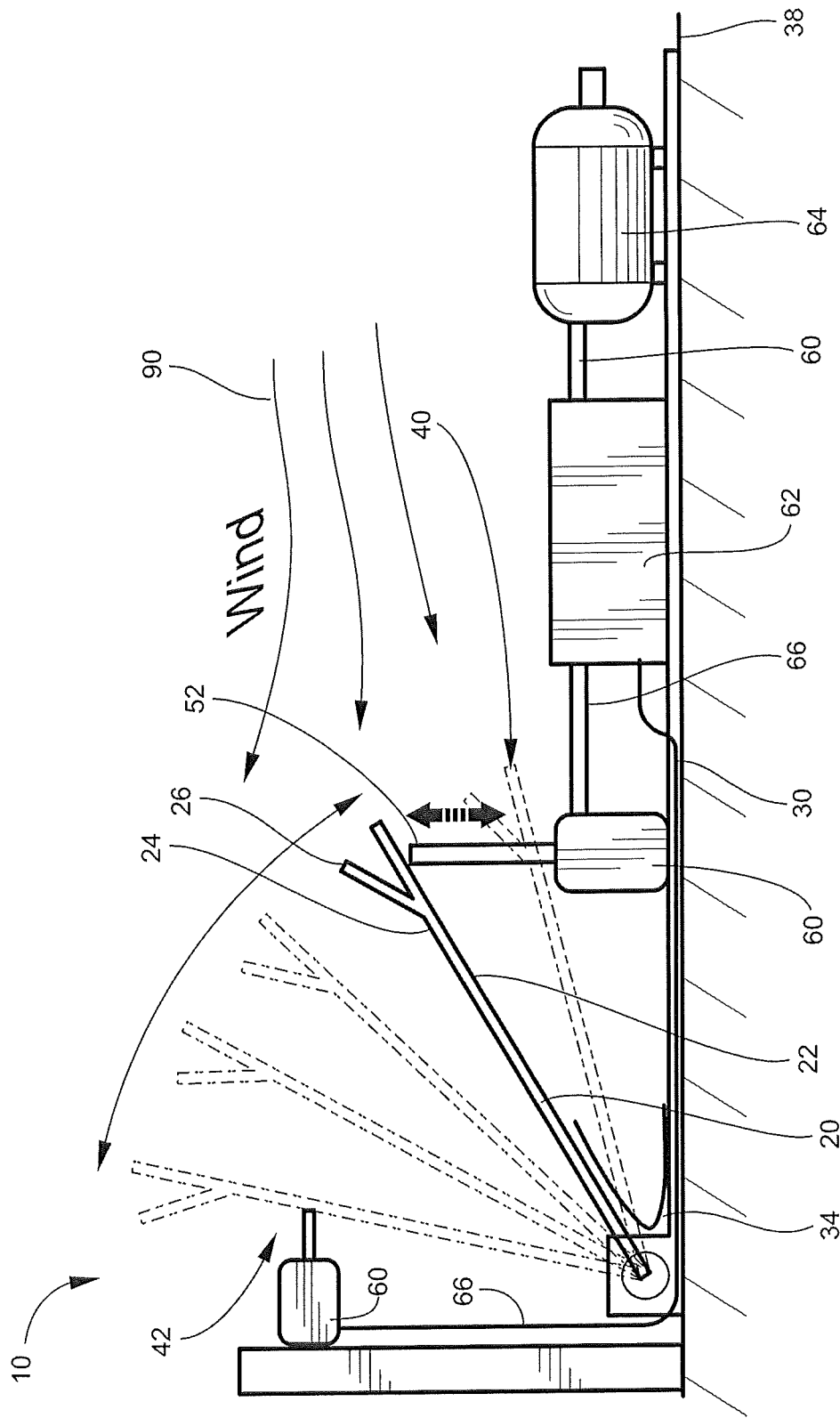
FIG. 15 is a side view of an embodiment of the apparatus having the panel at rest at an angle acute to the horizontal and also having a hydraulic generator operably attached to a leading edge of the panel and also to a vertical back stop for capturing energy as the panel reaches the vertical position.

In another embodiment, as shown in FIG. 15, rather than the stationary vertical back stop alone, the apparatus may utilize a hydraulic cylinder 60 attached to a stationary vertical back stop wherein the hydraulic cylinder 60 captures the energy of the panel 20 contacting the hydraulic cylinder 60 which hydraulic fluid is then transferred to the hydraulic reservoir 62 and then to a hydraulic generator 64 for generating electrical power which may be attached to an electrical grid.

Figure 6:
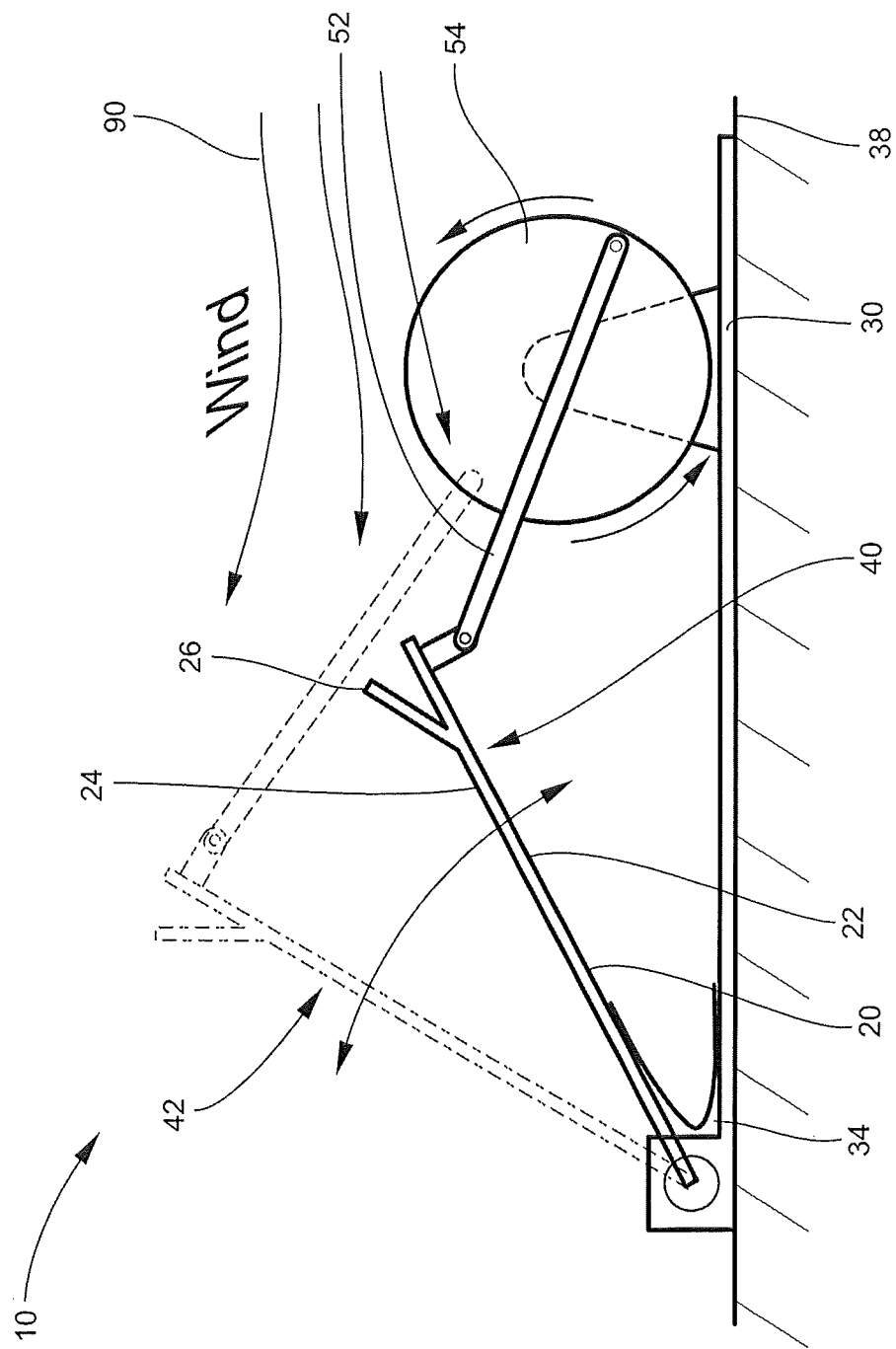
FIG. 6 is a side view of an embodiment of the apparatus having the panel at rest at an angle acute to the horizontal and having a connector rod operably attached to a fly-wheel.
Figure 7:
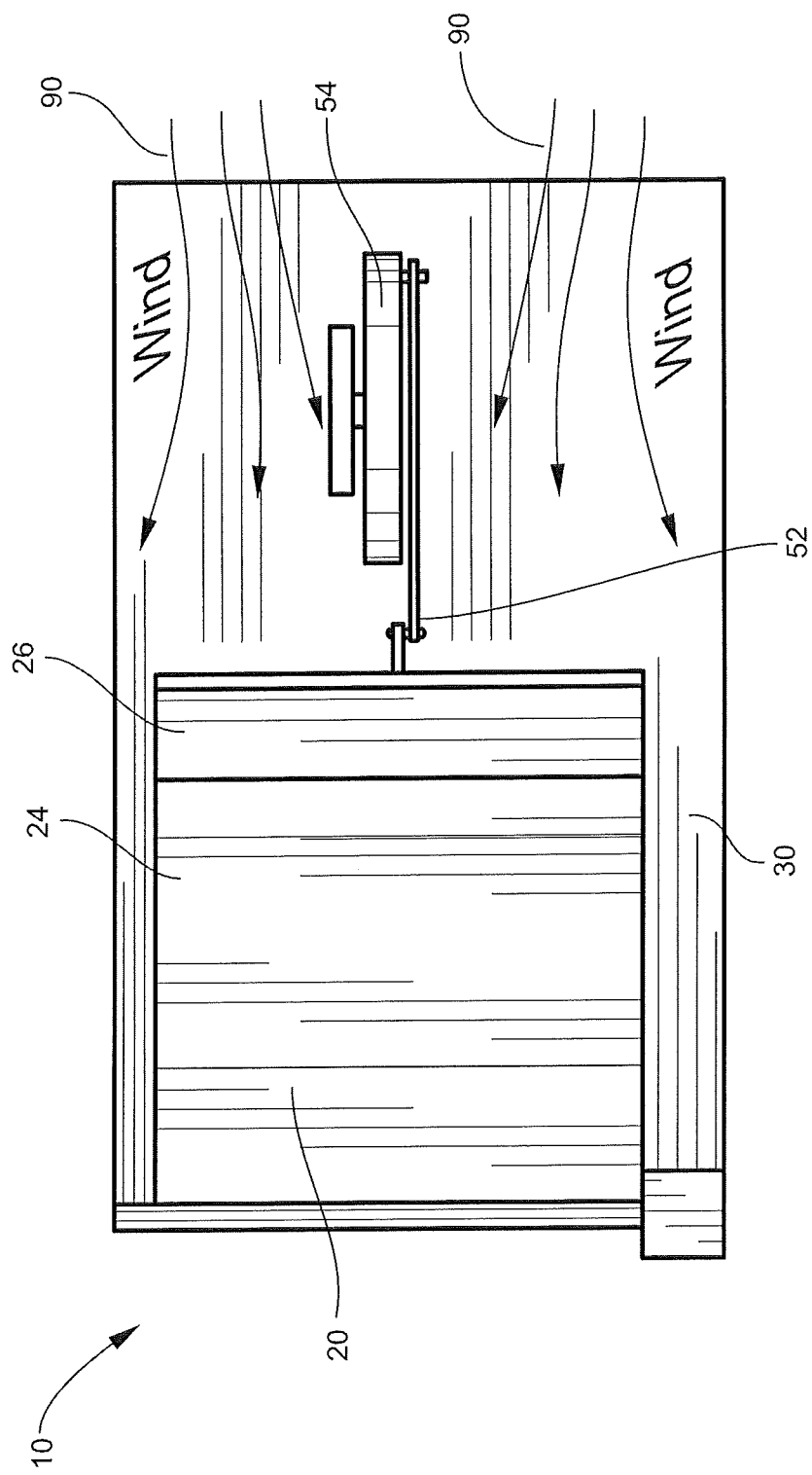
FIG. 7 is a top view of the embodiment of the apparatus of FIG. 6.

In another embodiment of the invention shown in FIGS. 6 and 7 a connector rod 52 is attached to a leading edge of the panel 20. This connector rod 52 is then attached to a flywheel 54 or other gearing arrangement to thereby drive a permanent magnet alternator that produces an electric current. Thus, in this embodiment, the wind power is harnessed for electrical power not via the pin of the hinge 36 rotating but via the movement of the connector rod 52.

Figure 4:
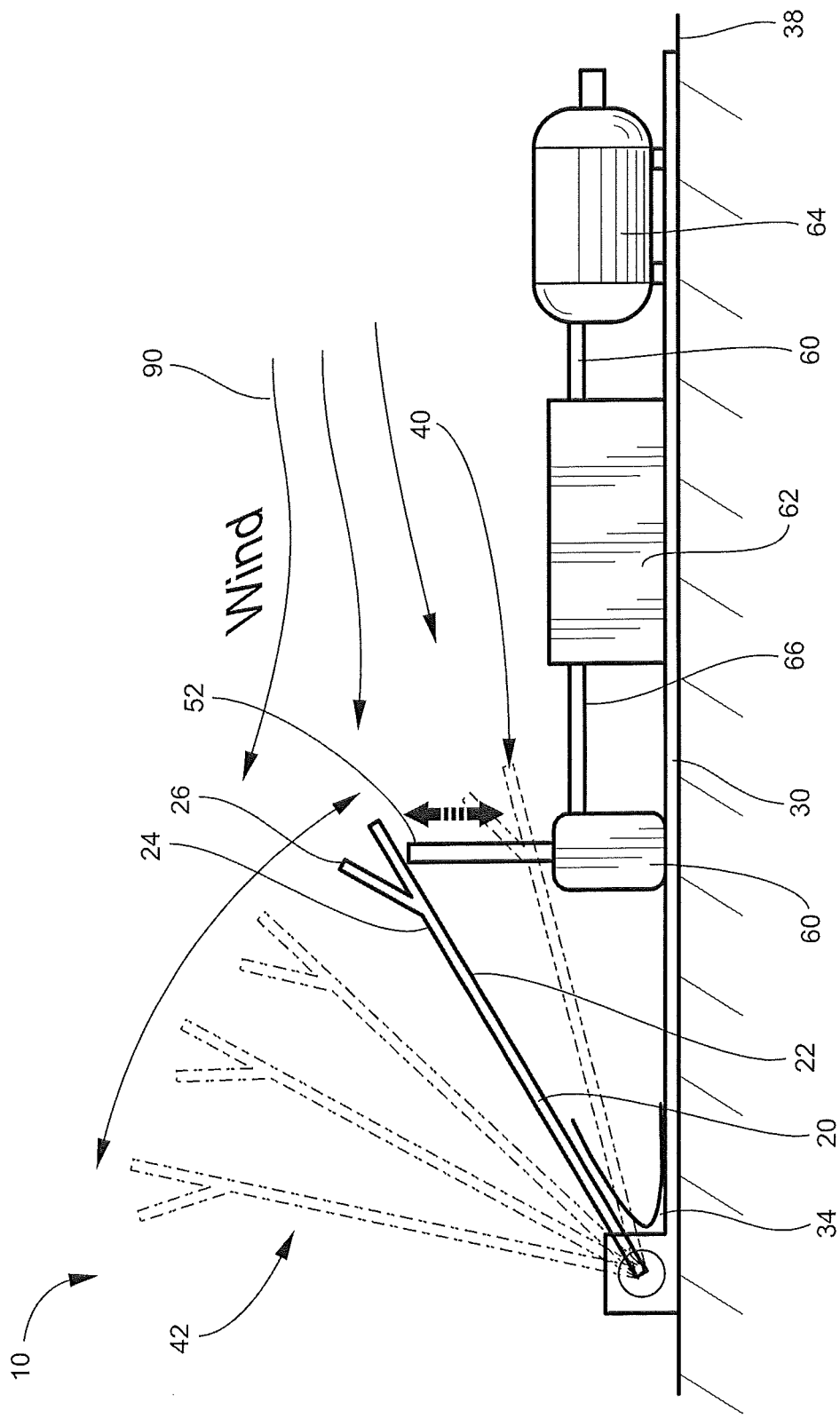
FIG. 4 is a side view of an embodiment of the apparatus having the panel at rest at an angle acute to the horizontal and also having a hydraulic generator operably attached.
Figure 5:
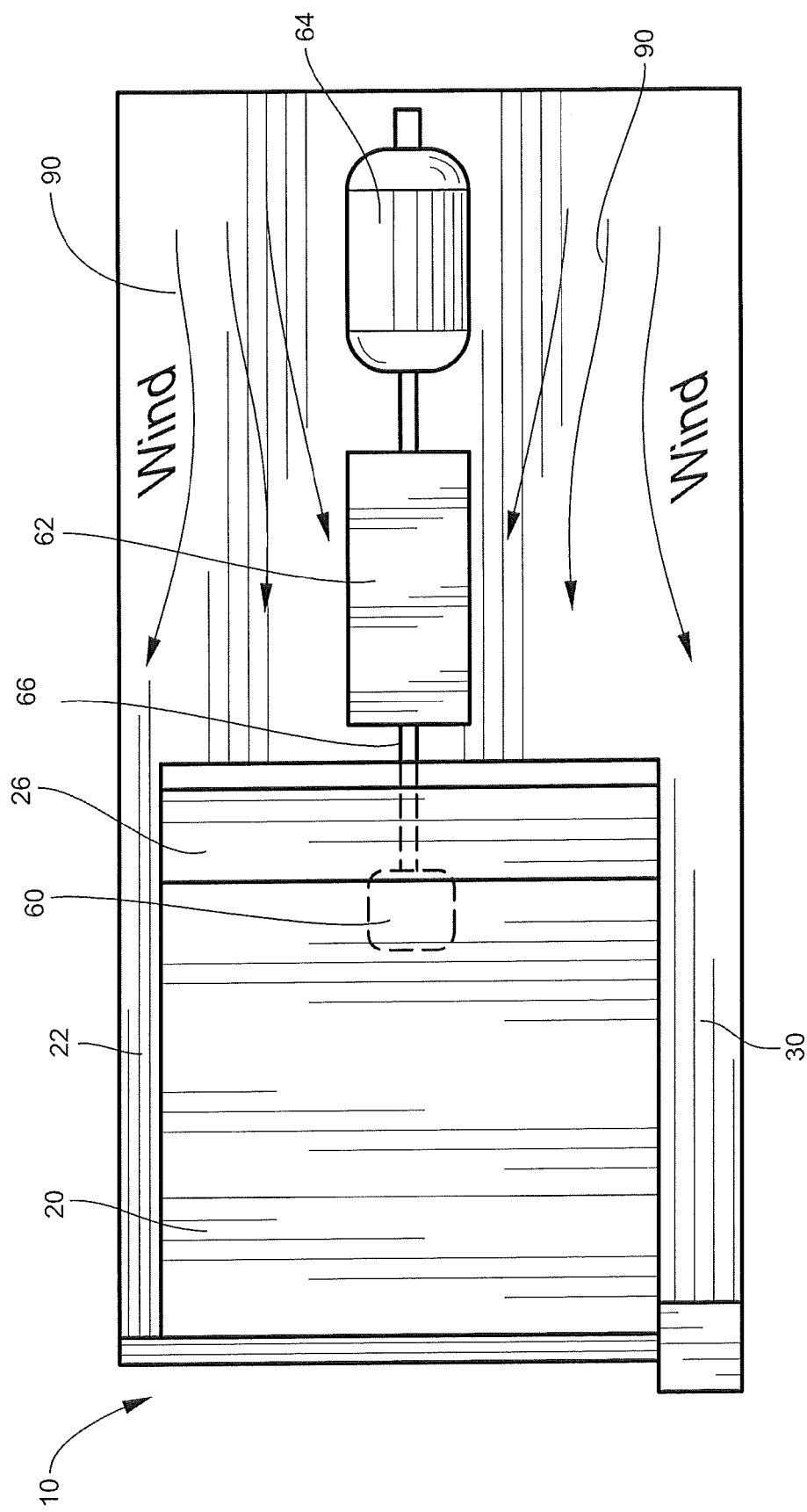
FIG. 5 is a top view of the embodiment of the apparatus of FIG. 4.

The embodiments of the power generating apparatus described thus far are directed to the power being generated by the rotation of a shaft or axle 36 either directly or via a connector rod 52 attached to a shaft. As shown in FIGS. 4 and 5, the invention contemplates that power generation may also be carried out using the panels 20 and frame 30 as described above but instead of being operably connected to a permanent magnetic alternator (or generator) 50, they are operably connected to a hydraulic cylinder 60, a hydraulic reservoir 62, and a hydraulic generator 64. In such an embodiment, a connector rod 52 is attached to a leading edge of the panel 20. The connector rod 52 is then attached to a hydraulic cylinder 60. The hydraulic cylinder 60 is connected to the hydraulic reservoir 62 by hoses 66 and the hydraulic reservoir 62 is attached to a hydraulic generator 64 by hoses 66. As the wind 90 continues or increases, the panel 20 is raised above the horizontal and pressure, or negative pressure as shown in FIG. 4, is applied to the hydraulic cylinder 60. The hydraulic cylinder 60 then stores the hydraulic fluid under pressure in an accumulator reservoir 62. When the pressure reaches an optimum level, the fluid is released to power a hydraulic electrical generator 64. The hydraulic cylinders 60, hydraulic reservoirs 62, and hydraulic generators 64 are all operably connected. Such connections may include pipes, hoses 66, and/or other fluid carrying conduit. Multiple hydraulic cylinders 60 may be used and they may be used in different stages throughout the pivoting of the panel on the frame. Each of the multiple hydraulic cylinders 60 may have different pressures such that a hydraulic cylinder 60 having a lower pressure may be utilized in an initial stage in order to capture power from lower force winds 90 and a hydraulic cylinder 60 having a higher pressure may be utilized in a later stage in order to capture power from higher force winds 90. Also, the staging of hydraulic cylinders 60 of varying pressures is also tied to the potential force required to move the panel and the potential force to be gained by the movement of the panel 20 at various stages of its movement. That is, as the panel approaches the vertical or operating position 42, it is more easily moved by the wind 90 but it also can generate more power. Thus, the various hydraulic cylinders 60 can be optimally arrayed in order to harness the maximum power from given wind conditions.

The frame 30 of the above described embodiments may be mounted with an attached wind vane (not shown). The wind vane rotates with the direction of the intermittent wind 90 and also functions to rotate the frame 30 so that the panels 20 optimally are positioned in a direction to take advantage of the wind 90.

Figure 8:
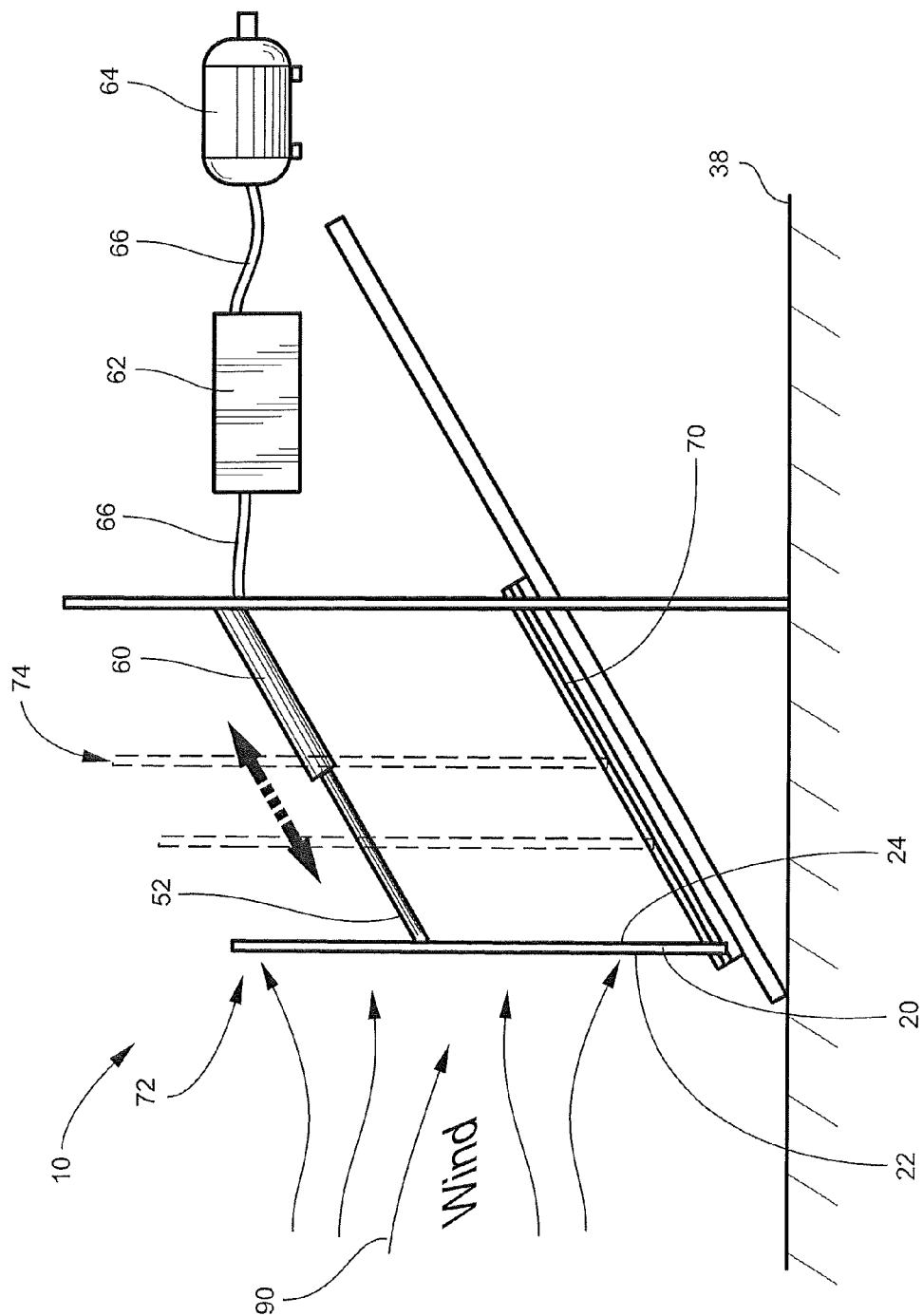
FIG. 8 is a side view of an embodiment of the apparatus having the panel in vertical orientation attached to an inclined track and operably attached to a hydraulic generator.
Figure 9:
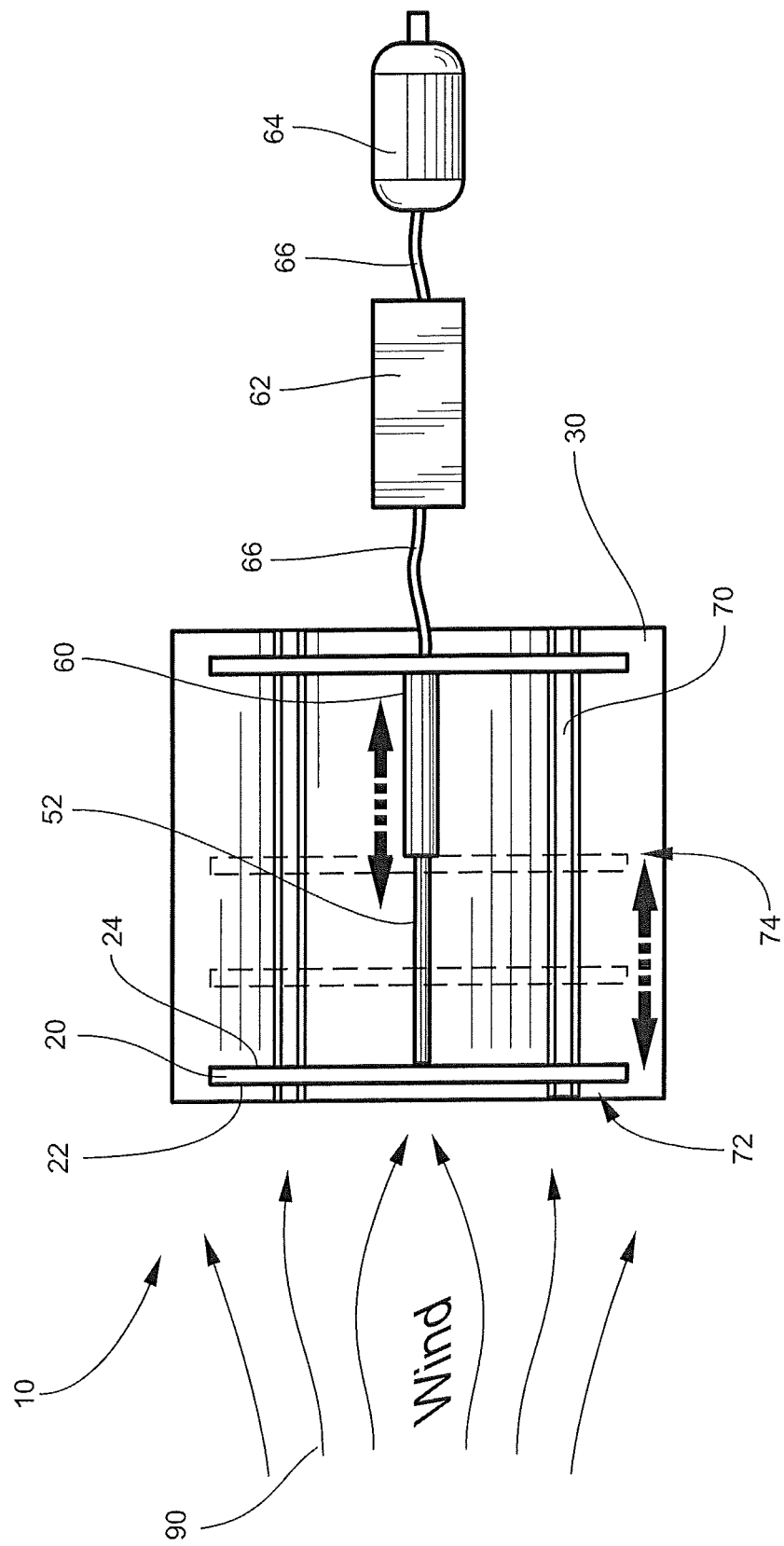
FIG. 9 is a top view of the embodiment of the apparatus of FIG. 8.

Another embodiment, as shown in FIGS. 8, 9, and 10, uses a similar hydraulic power generation apparatus as just described but the panels 20 are arrayed and fixed in a vertical arrangement instead of substantially horizontal or instead of some acute angle. This embodiment includes at least one track fixed 70 at an incline to the horizontal 38. The panels 20 are slidingly attached to the track 70. The panels are at a resting position at the bottom of the track 72. As wind is applied to the panels 20, the panels 20 slide up the track 70 maintaining their vertical orientation and constituting an operating position 74. The panels are also attached to connector rods 52. The connector rods 52 may be parallel to the angle of the inclined track 70. As the panels 20 slide up the track 70, the connector rods 52 actuate and apply pressure to the hydraulic cylinders 60. The hydraulic cylinders 60 then store the hydraulic fluid under pressure in an accumulator reservoir 62. When the pressure reaches an optimum level, the fluid is released to power a hydraulic electrical generator 64. Multiple hydraulic cylinders 60 may be used and they may be used in different stages as the panel 20 moves in the operating position 74 up the track 70. When the wind 90 has died or otherwise ceases to apply sufficient pressure, the panels 20, acting under the force of gravity, slide back down the track 70 towards the resting position 72. Additional power may be generated by using additional hydraulic cylinders 60 as the panels 20 slide back down the track 70 towards the resting position 72 under the force of gravity.

The embodiments of the power generating apparatus 10 herein described are adapted for convenient placement wherever gusty 90 and intermittent winds are found. As discussed above, they may also be applied to situations where fluids other than wind 90 are present, such as water currents or waves. In the preferred embodiment, the apparatus is mounted upon the frame 30, the power generating apparatus 10 is free standing and can be placed along a roadway, in the median of a highway, on the rooftop of a building 92 as shown in FIG. 10, or adjacent an airport runway. When adjacent an airport runway, it may capture the wind from airplanes taking off and landing. The power generating apparatus 10 can be surrounded by a wire mesh to prevent animals from getting injured or damaging a part of the apparatus. The overall dimensions of the apparatus 10 and the panel 20 can vary according to its use and location. For example, placed along a highway the panel could be approximately two feet high and fifty or one hundred feet long. The panel 20 could be placed parallel to the roadway to receive gusts 90 from passing cars. These are examples only and do not restrict the invention in any way.

The power generated by the apparatus 10 can provide power to equipment and facilities remote from other power sources. Thus it is suitable for use in powering remote monitoring systems such as weather monitoring systems, seismic activity monitoring equipment, pipeline monitors, systems that measure water levels and detect contaminants, remote radioactivity detection systems, and more. The power generating apparatus 10 can power broadcast towers on mountain tops, and security systems along territorial boundaries. Along roadways, the power generating apparatus 10 can be used to power traffic cameras, ice-monitoring equipment, emergency call boxes, and the like. The power generating apparatus 10 can be deployed in the extreme environments of mountain tops and arctic areas to power research facilities, emergency survival facilities, and communication equipment. The power generating apparatus 10 can be particularly valuable useful in storm conditions when power demands are high and utility grid systems often fail.

The power generating apparatus 10 can be used to charge one or more batteries or to directly power one or more appliances. Furthermore, the power generating apparatus 10 can be used to generate power to sell to a power company with suitable metering to assure proper payment or credit from the power company.

The panels 20 of the above designs may, additionally, each be fitted with or have printed thereon various display indicia. These indicia may be in the form of advertisements or other signage.

Figure 12:
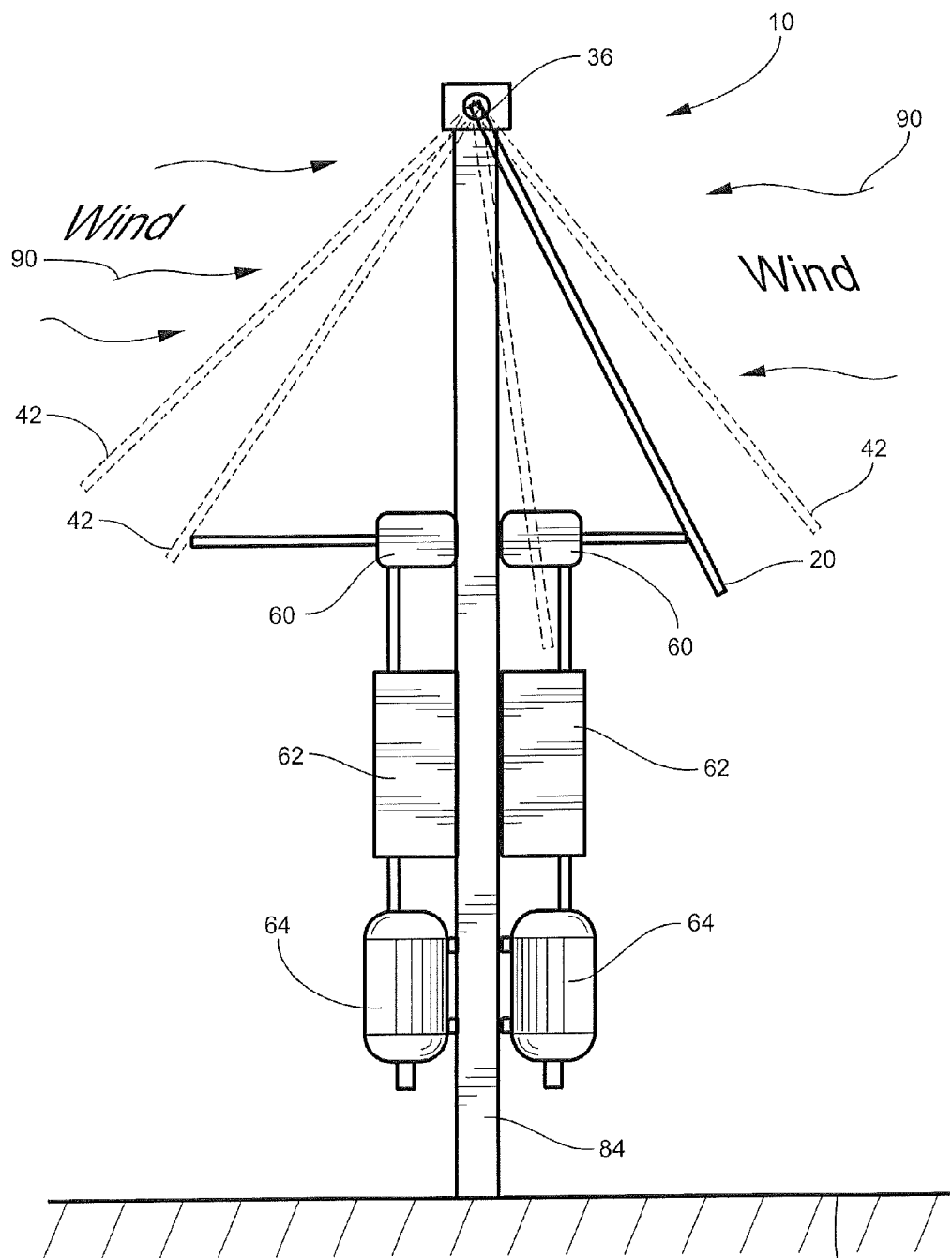
FIG. 12 is a side view of an embodiment of the apparatus having panels positioned vertically when at rest where the power generating hydraulic cylinders are attached to the post.
Figure 13:
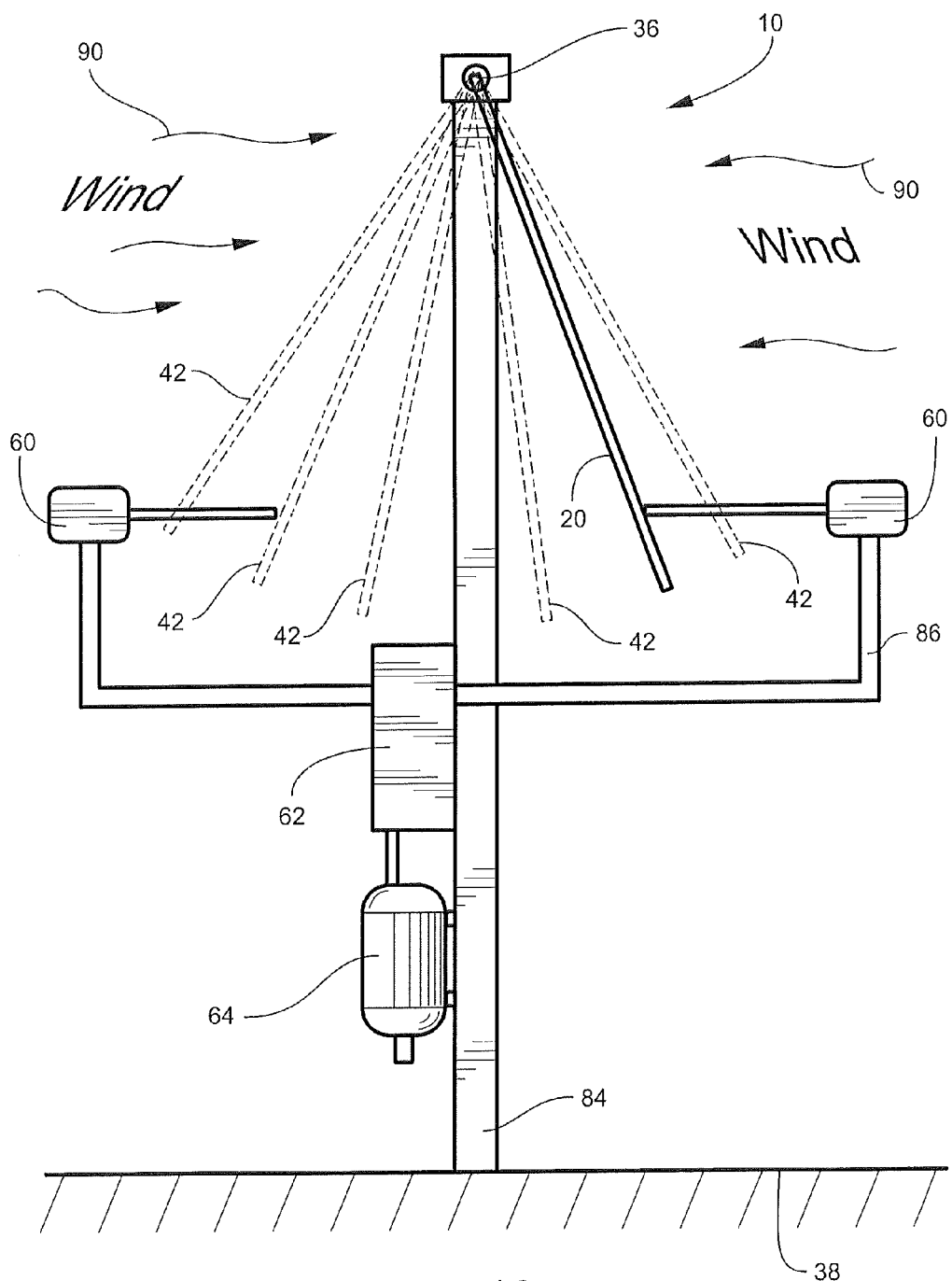
FIG. 13 is a side view of an embodiment of the apparatus having panels positioned vertically when at rest where the power generating hydraulic cylinders are attached to a lower horizontal member.
Figure 14:
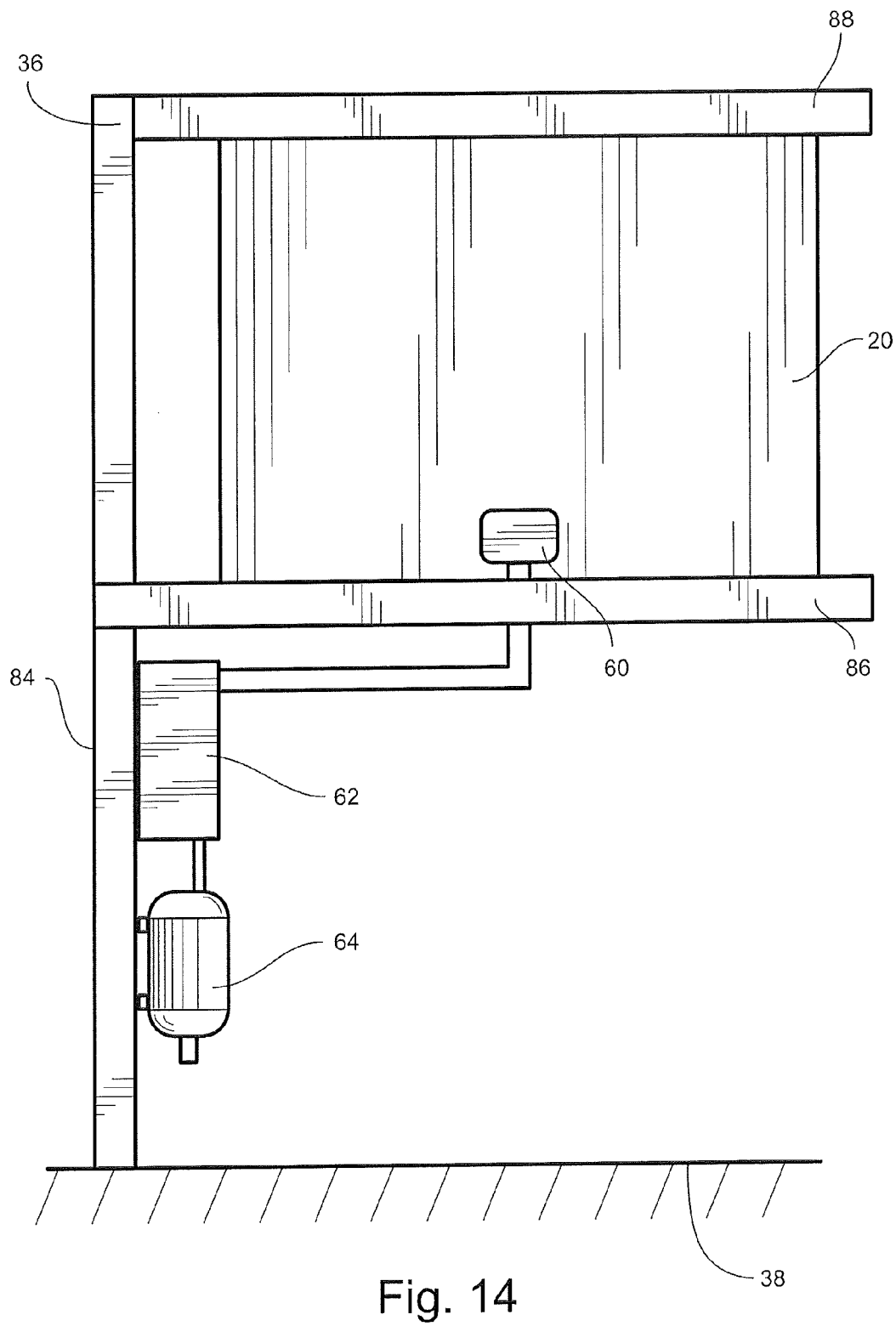
FIG. 14 is a side view of an embodiment of the apparatus having panels positioned vertically when at rest where the power generating hydraulic cylinders are attached to a lower horizontal member.

Another embodiment of the invention includes the apparatus 10 as shown in FIGS. 12, 13, and 14 which includes the panels 20 situated in a vertical position when at rest relative to the horizontal ground 38. In such an embodiment, the panels 20 pivot outward from the vertical in a direction towards the horizontal via a hinge 36 attached to a frame having a post 84 and an upper horizontal member 88. Horizontal member 88 is displaced from the horizontal ground 38 by post 84 and is attached at an upper extent of post 84. In this embodiment of the apparatus 10, the panels 20 are adapted to receive wind 90 from both sides of the panels 20. Connector rods from hydraulic cylinders 60 may be attached to a leading edge of the panels 20. The hydraulic cylinders 60 may be operably connected to a hydraulic reservoir 62, which is operably connected to a hydraulic generator 64. The embodiment of FIGS. 12, 13, and 14 includes at least two such hydraulic cylinders 60 but may include one or more hydraulic reservoirs 62 and one or more hydraulic generators 64.

The hydraulic generators 64 and hydraulic reservoirs 62 may be attached to the post 85. The hydraulic cylinders 60 may be attached to the post 84, as in FIG. 12 or to a second horizontal member 86, as in FIG. 13 and FIG. 14, which is also attached to the post 84 and is substantially parallel to the horizontal ground 38. In either the embodiment of FIG. 12 or of FIGS. 13 and 14, the connector rods of the hydraulic cylinders 60 are attached to a leading lower edge of the panels 20. In the embodiment of FIG. 12, the rod is attached to an end portion of the leading edge of the panels 20 whereas in the embodiment of FIGS. 13 and 14 the rod is preferably attached to a center portion of the leading edge of the panels 20. In either the embodiment of FIG. 12 or of FIGS. 13 and 14, the connector rods, in addition to serving as an element of the power generator hydraulic cylinder 60, 62, and 64, serve to limit the angle of pivot of the panel 20 from the vertical rest position towards the operating position 42. This function may be of use where an embodiment includes advertising indicia located on the panel 20.

Figure 16:
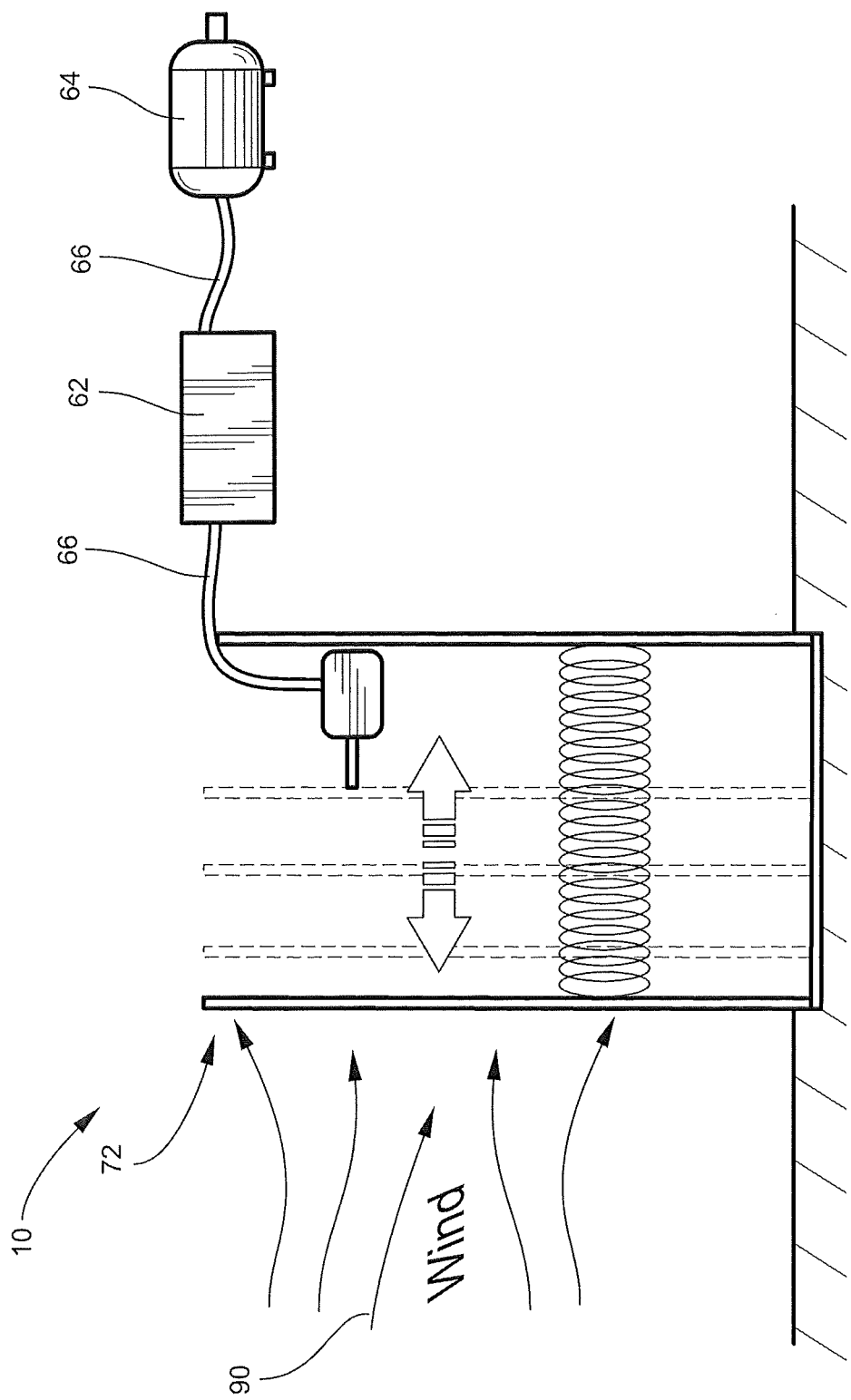
FIG. 16 is a side view of an embodiment of the apparatus having the panel in vertical orientation attached to a horizontal track and to a return spring and operably attached to a hydraulic generator.

Another embodiment of the invention includes the apparatus 10 as shown in FIG. 16. This embodiment is similar to the embodiment shown in FIGS. 8, 9, and 10 except the track 70 is placed along a horizontal surface rather than an inclined surface and rather than gravity returning the panel to the rest position, a spring, such as a coiled spring, returns the panel to the rest position 72. As such, the embodiment of FIG. 16 uses a similar hydraulic power generation apparatus as has been describe herein. The panels 20 are arrayed and fixed in a vertical arrangement. The panels 20 are slidingly attached to the track 70. The panels are at a resting position at one end of the track 70. As wind is applied to the panels 20, the panels 20 along up the track 70 maintaining their vertical orientation and constituting an operating position 74. The panels are also attached to connector rods 52. The connector rods 52 may be parallel to the angle of the inclined track 70. As the panels 20 slide along the track 70, the connector rods 52 actuate and apply pressure to the hydraulic cylinders 60. The hydraulic cylinders 60 then store the hydraulic fluid under pressure in an accumulator reservoir 62. When the pressure reaches an optimum level, the fluid is released to power a hydraulic electrical generator 64. Multiple hydraulic cylinders 60 may be used and they may be used in different stages as the panel 20 moves in the operating position 74 along the track 70. When the wind 90 has died or otherwise ceases to apply sufficient pressure, the panels 20, acting under the force of a return spring, slide back along the track 70 towards the resting position 72. Additional power may be generated by using additional hydraulic cylinders 60 as the panels 20 slide back along the track 70 towards the resting position 72 under the force of the spring. Double acting plunger cylinders may be utilized to capture the energy from the intermittent gusty wind by utilizing plungers in both directions of the panel 20 along the track 70. Such a double acting plunger cylinder may include the RRH-Series Double Acting Hollow Plunger Cylinder made by Enerpac.

The embodiments of any of FIGS. 1-16 may include photovoltaic cells located on the panels 20 for the collection and conversion of sun light into electrical energy. The embodiments of FIGS. 1-7 may include the photovoltaic cells on one side of the panel 20—the side adapted for receiving wind 90. The embodiments of FIGS. 8-14 may include the photovoltaic cells on one or both sides of the panels 20.

The embodiments of FIGS. 1-16 may be located and deployed on rooftops of buildings (as in FIG. 10 but also to include flat roofs—not shown) to enhance the viewing of any advertising indicia displayed thereon and also to aid in cooling of the building during the summer.

The panel 20 as described in the embodiments of FIGS. 1-16 is not an unduly limiting term. The term panel 20 as used herein is intended to define a planar surface capable of contacting fluid flow and transferring that flow into electrical power by utilizing the attached devices, such as the permanent magnetic alternator (or generator), hydraulic generators, and the like. For instance, the panel may comprise an advertising sign atop a building, a score board at a sports venue, a large flat panel video monitor, a panelized photovoltaic cell cluster, roadway signs, and even curtain walls of buildings. In the latter instance, the curtain walls of a building may be attached to high pressure "pancake" hydraulic cylinders. These "pancake" cylinders can capture the energy from the movement of the curtain walls in the building even where the walls only move fractions of an inch in response to fluid flow.

Figure 17:
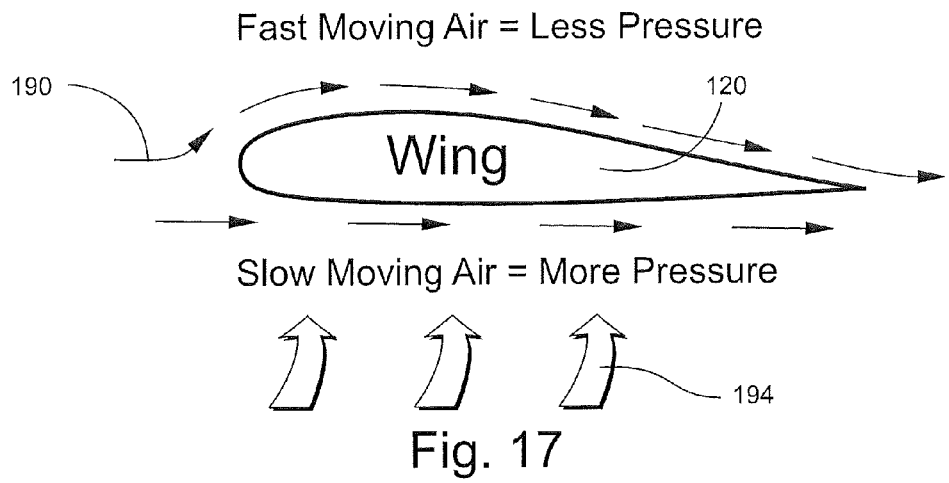
FIG. 17 is a side view showing a cutaway view of an airfoil "wing" and illustrating the movement of fast and slow moving air around the airfoil.

Referring now to FIGS. 18-23, the invention 100 contemplates utilizing an airfoil 120 to generate vertical lift in place of the planar surface of the panel 20 described in, inter alia, FIGS. 1 and 2. As shown in FIG. 17, fluid 190 flows around an airfoil 120 resulting in lift 194. An airfoil 120 cross-section is shown in FIGS. 18-23 and is in the general shape of an aircraft wing cross-section.

Figure 18:
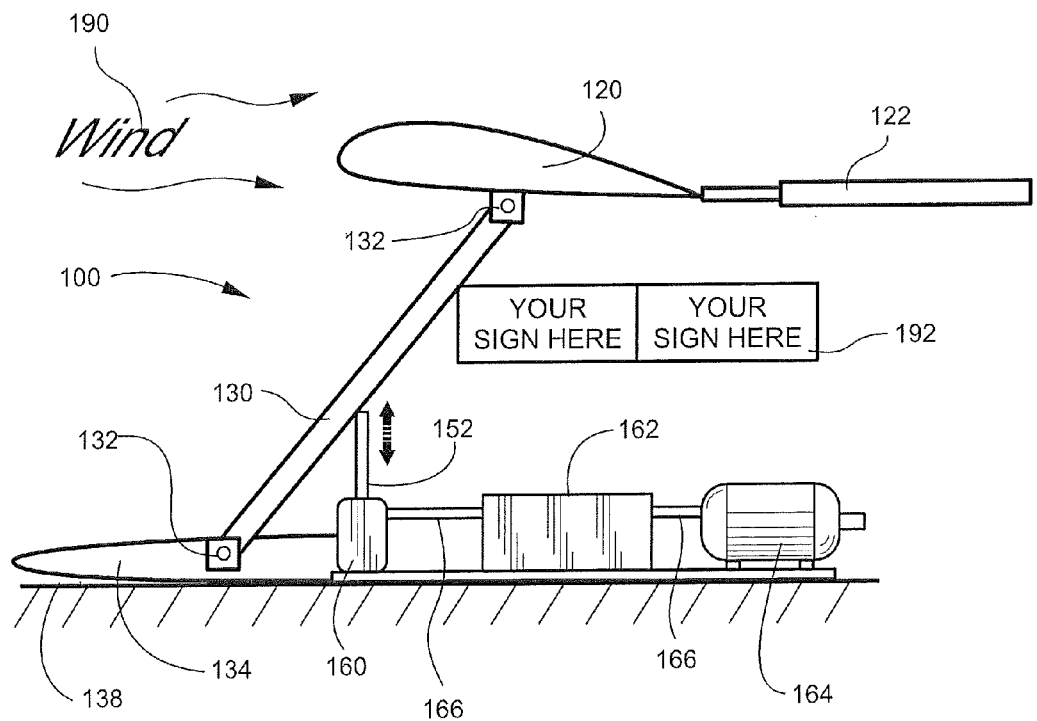
FIG. 18 is a side view of the airfoil embodiment of the invention utilizing hydraulic cylinder and hydraulic generators.

As shown in FIG. 18, the airfoil 120 of the present invention 100 may be hingedly 132 attached to a rigid vertical support 130. The hinges 132 may allow the airfoil 120 to pivot at the connection to the vertical support 130 and also may allow the vertical support 130 to pivot relative to a base 134. The base may rest on the horizontal ground 138 or on another structure such as an automobile or train (not shown). Advertising indicia or other signage 192 may be attached to the vertical support 130. A connector rod 152 may be hinged attached to the vertical support 130 and the connector rod 152 may be connected to a hydraulic cylinder 160. The hydraulic cylinder 160 may be connected via a hose 166 to a hydraulic reservoir 162 which may likewise be connected to a hydraulic generator 164. The hydraulic generator 164 may produce electrical power. A horizontal stabilizer 122 may be attached to a trailing end of the airfoil 120.

As shown in FIGS. 19A, 19B, and 19C, the airfoil 120 may lift from the rest position of FIG. 19A to an intermediate position of FIG. 19B in the presence of wind. The airfoil 120 may further lift to the fully extended position of FIG. 19C in the presence of strong wind. The vertical support 130 may be telescoping and extend from the rest position of FIG. 19A to the fully extended position of FIG. 19C. The advertising signage 192 may be increased as the vertical support 130 is extended.

As shown in FIG. 20, the base 134 may be a turntable and a wind vane 136 may be attached to the vertical support 130 so that that the airfoil 120 is turned to optimize capture of wind 190.

Figure 21:
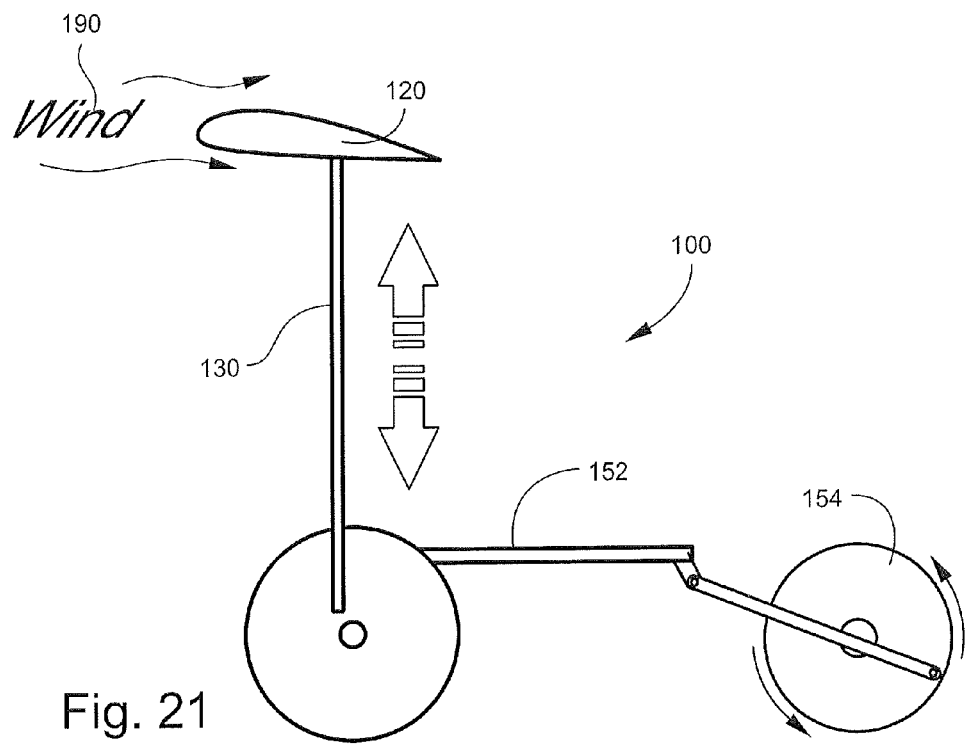
FIG. 21 is a side view of the airfoil embodiment of the invention utilizing cranks, gears, and mechanical permanent magnet alternators.

As shown in FIG. 21, instead of, or in addition to the hydraulic generator, the invention 100 contemplates use of a crank and connector rod 152 attached to a wheel 154 which may generate electrical power utilizing a permanent magnet alternator. As wind 190 blows and results in lift of the airfoil 120, the vertical support lifts and moves the crank and connector rod 152. This in turn rotates the wheel 154 which may generate power. The invention 100 contemplates that the wheel 154 may contain a sprag clutch.

Figure 22:
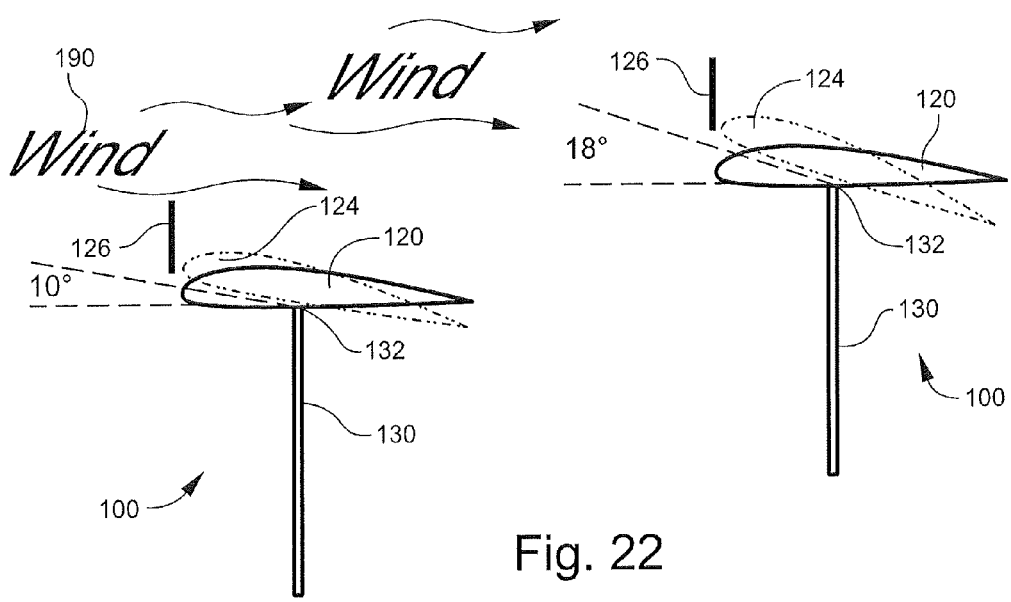
FIG. 22 is a side view of the airfoil embodiment of the invention illustrating the airfoil's response to a fluid such as wind or water.

As shown in FIG. 22, the airfoil 120 may be hingedly 132 attached to the vertical support, 130 such that the lift of the airfoil 120 moves from a rest position at zero degrees upward to an angle of 10 degrees and eventually to maximum angle of 18 degrees.

As wind 190 blows, the airfoil 120 stalls at 18 degrees, limiting production of power, and thus a shroud 126 may be utilized to maximize the power and keep the airfoil 120 at or below 18 degrees. The shroud 126 may be placed at a position 18 degrees above the leading edge of the airfoil 120.

Figure 23:
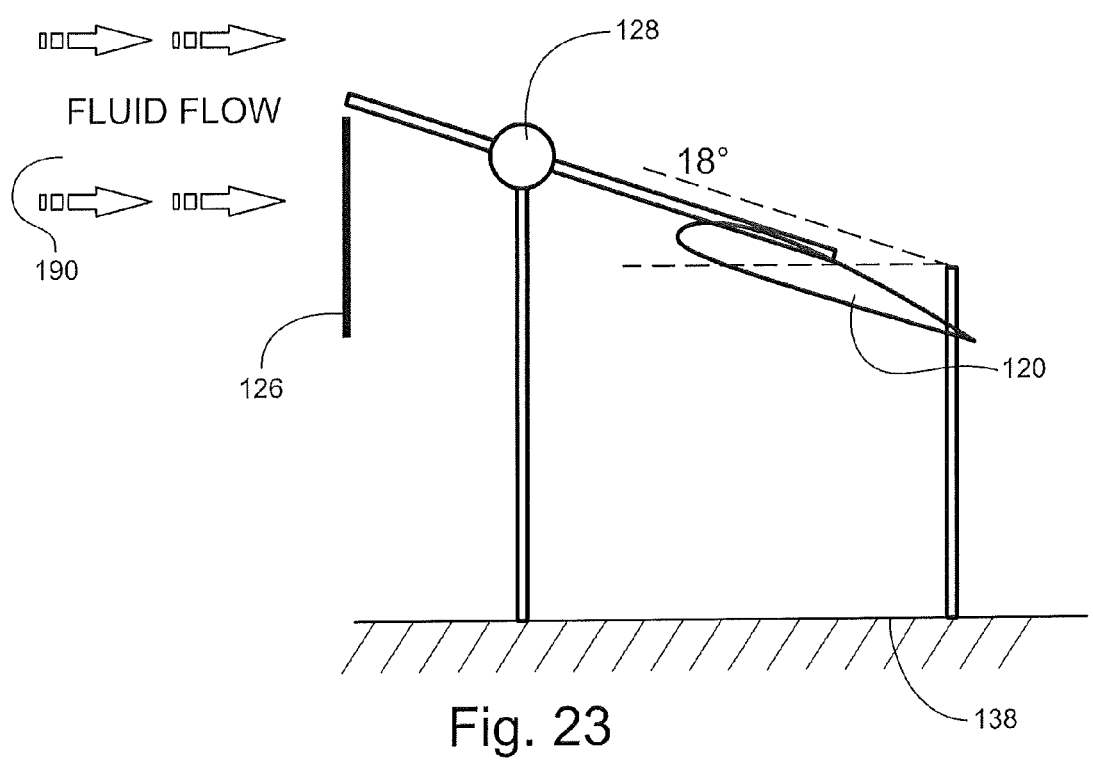
FIG. 23 is a side view of the airfoil embodiment of the invention illustrating the use of a mechanical shroud to keep the airfoil from exceeding the 18 degree threshold for lift.

As shown in FIG. 23, as the fluid 190 flows across the airfoil 120, the lift dissipates as the airfoil 120 stalls at 18 degrees above the horizontal 138. FIG. 23 shows a vertical shroud 126 which has been deployed by a mechanical seesaw apparatus 128. The seesaw apparatus 128 is designed to deploy the shroud 126 to prevent stalling beyond 18 degrees. The shroud 126 is attached to one end of the seesaw apparatus 128 and the other end of the seesaw apparatus 128 is attached to the leading edge of the airfoil 120. When the airfoil 120 is at an angle less than 18 degrees (or less than 15 degrees in an alternate embodiment), the shroud is not deployed to impact air flow 190 across the airfoil 120. However, as the airfoil 120 lifts from the rest position, and approaches the 18 degree threshold, the seesaw causes the shroud to lower and impede the airflow 190 keeping the airfoil at or below 18 degrees.

Figure 24:
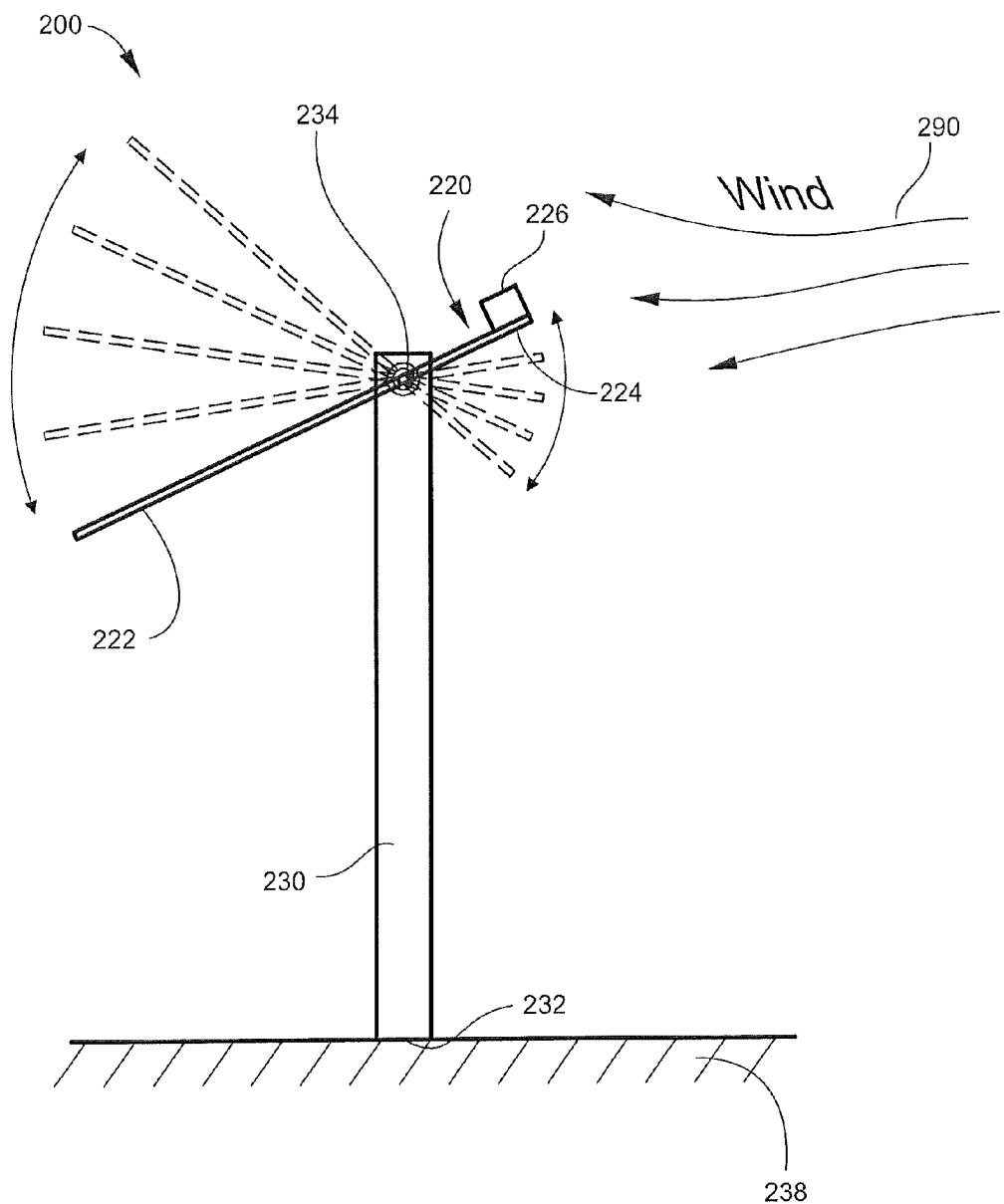
FIG. 24 is a side view of the planar airfoil embodiment of the invention.
Figure 25:
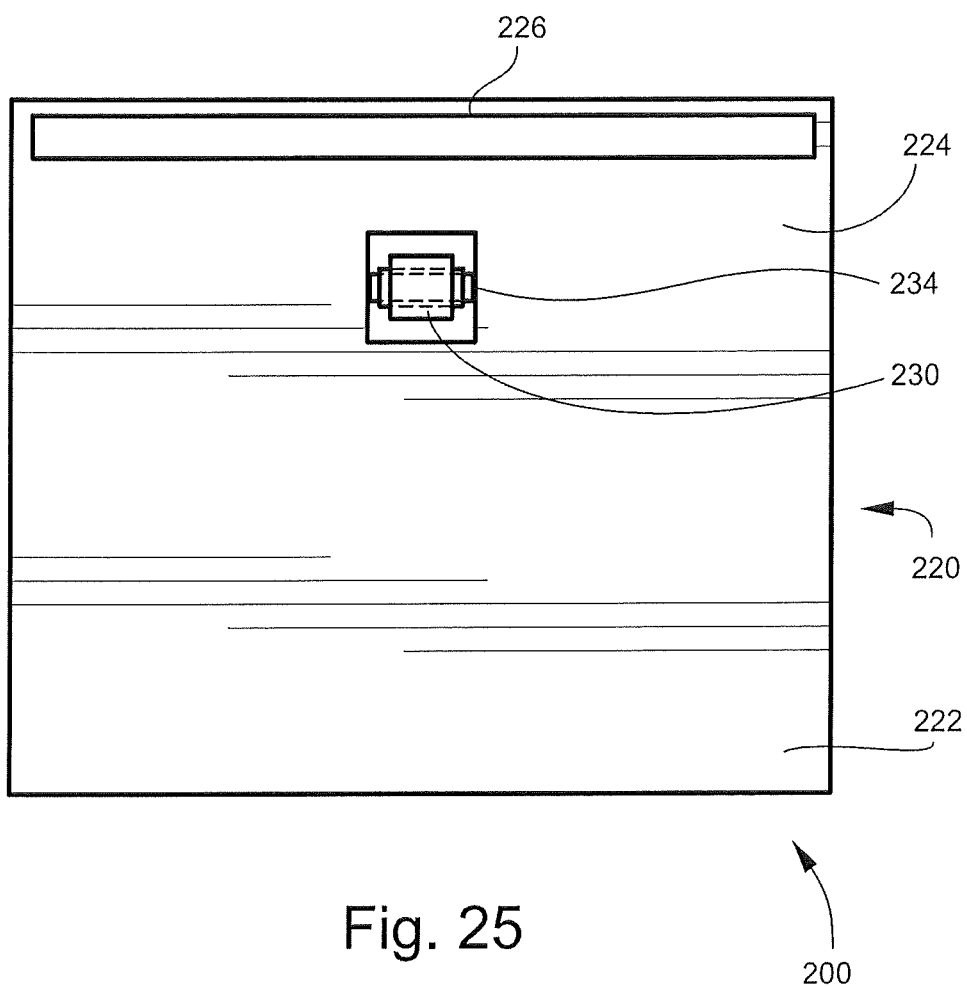
Figure 26:
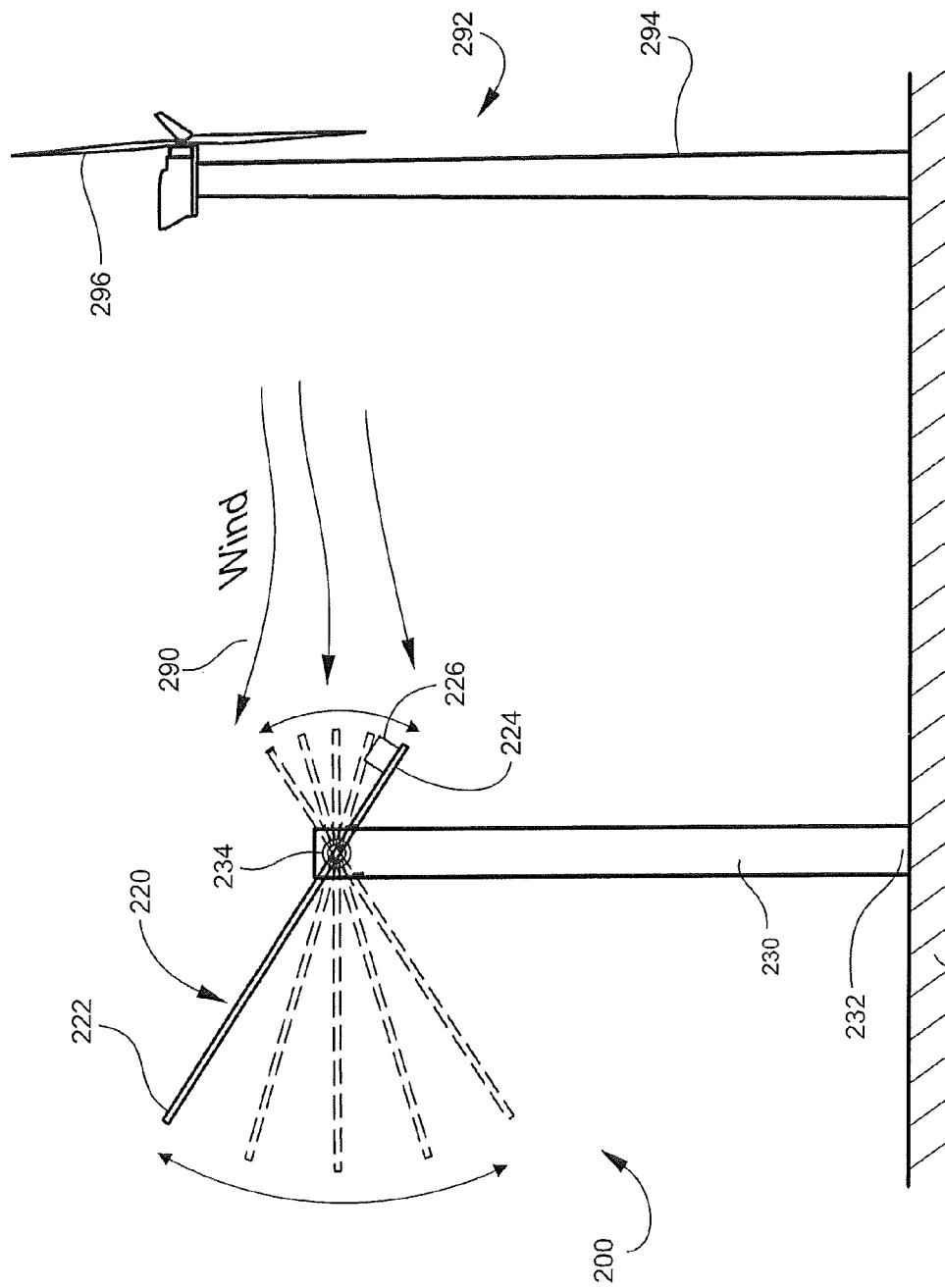
FIG. 26 is a side view of the planar airfoil embodiment of the invention illustrating the placement of the airfoil downwind from a horizontal axis wind turbine.

Referring now to FIGS. 24-26, the invention 200 contemplates utilizing an airfoil, which may be a planar airfoil 220 rather than the shaped airfoil 120 of FIGS. 18-23, to generate vertical lift or pivoting of the planar airfoil 220. As shown in FIG. 24, fluid 290 flows around the planar airfoil 220. The planar airfoil 220 is shown in FIG. 25 as having a generally rectangular shape and is pivotally attached 234 to a mast 230. The lower portion 232 of the mast 230 is fixed to the ground 238. The planar airfoil 120 pivots about an upper portion of the mast 230 at the pivot point 234. Preferably, the planar airfoil 220 has a short side 224 weighted with an attached weight 226 disposed to one side of the pivot point 234 of the mast 230 and a longer side 222 disposed to the other side of pivot point 234 of the mast 230.

The weight located on the short side 224 causes the planar airfoil 220 to be biased in a position with the longer side 222 tilted away from the ground 238 due to the force of gravity. As wind 290 blows, the long side 222 of the planar airfoil 220 moves downward as the planar airfoil 220 pivots about the pivot point 234. Likewise, the short side 224 tilts upwards away from the ground 238 in the presence of wind 290.

Preferably, the invention 200 is deployed such that wind 290 or other fluid flow contacts an upper surface of the longer side 222 of the planar airfoil 220. As has been described with respect to other embodiments, the planar airfoil 220 about pivot point 234 may be operably connected to a permanent magnet generator or alternator and appropriate gearing so as to produce electrical power. See, e.g., FIGS. 6, 7, 11, and 21. Alternatively, as has been described with respect to other embodiments, the planar airfoil 220 about the pivot point 234 may be operably connected to a hydraulic cylinder in combination with a accumulator reservoir and a hydraulic generator so as to produce electrical power. See, e.g., FIGS. 4, 5, 8, 9, 10, 12-16, and 18.

Referring now specifically to FIG. 26, the invention 200 specifically contemplates that the planar airfoil 220 be deployed downstream from a horizontal axis wind turbine 292. Horizontal axis wind turbines 292 typically have a mast 294 raising a plurality of blades 296 a distance above the ground. The air flow 290 from the blades 296 is dispersed downstream creating packets of wind—the blades 296 having "chopped" the wind flow 290. The device 200 can be deployed to take advantage of these packets of wind 290 which will necessarily be intermittent due to the blades 296 of the turbines 292. In this way, the planar airfoil 220 will pivot about the pivot point 234 as the packets of air impact the upper surface of the longer side 222 of the planar airfoil 220. The impact of the packets of air 290 on the upper surface of the longer side 222 will cause the shorter side 224 biased by the weight 226 in a relatively downward position to move upward relative horizontal ground 238. Likewise, the longer end 222 will move downward relative horizontal ground 238 upon impact of the packets of air 290. The height of the mast 230 may be adjusted to maximize capture of the intermittent wind 290 from the wind packets 290. As has been described with respect to other embodiments, the planar airfoil 220 about pivot point 234 may be operably connected to a permanent magnet generator or alternator and appropriate gearing so as to produce electrical power. See, e.g., FIGS. 6, 7, 11, and 21. Alternatively, as has been described with respect to other embodiments, the planar airfoil 220 about the pivot point 234 may be operably connected to a hydraulic cylinder in combination with a accumulator reservoir and a hydraulic generator so as to produce electrical power. See, e.g., FIGS. 4, 5, 8, 9, 10, 12-16, and 18.

The foregoing has described an apparatus 10, 100, and 200 for power generation utilizing intermittent and also constant fluid flows 90, 190, and 290. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A power generating apparatus adapted for utilizing fluid flow comprising:

a. an airfoil having a rounded leading edge and a sharp trailing edge pivotally connected to a rigid vertical support at a point between the rounded leading edge and the sharp trailing edge and biased in a rest position that is substantially horizontal relative level ground when no wind is present such that upon intermittent winds contacting the airfoil, the leading edge of the airfoil pivots upward, from the rest position and in the absence of wind returns to the rest position;
   b. a base pivotally connected to the vertical support;
   c. a power generator carried by the base and adapted to actuate when the airfoil moves from the rest position in response to the gusty wind such that power is generated for use by a power consuming, a power storing, or a power transmitting device; and
   d. a second smaller inverted airfoil attached to the airfoil and extending on the underside of the airfoil in an opposite orientation.

2. The power generating apparatus of claim 1 wherein the vertical support comprises a telescoping function, biased in the rest position in the absence of gusty wind, and operating from the rest position to a fully extended position such that as wind contacts the airfoil, the airfoil lifts upward extending the vertical support toward the fully extended position and in the absence of gusty wind the vertical support returns to the rest position.

3. The power generating apparatus of claim 2 wherein the base further comprises a turntable and a wind vane is attached to the vertical support, the turntable and the wind vane operating to ensure that the airfoil faces the optimum direction for harvesting gusty winds.

4. The power generating apparatus of claim 2 wherein signage is attached to the vertical support and signage comprises a plurality of individual signs such that as the vertical support moves from the rest position to the fully extended position the individual signs are visible.

5. The power generating apparatus of claim 1 wherein the power generator further comprises a connector rod attached to the vertical support wherein the connector rod is also connected to a flywheel attached to a crankshaft that is operably connected to a permanent-magnet alternator that generates electrical power as the shaft rotates, the crankshaft rotating as the connector rod moves upward relative to the horizontal ground in response to the airfoil moving from the rest position.

6. The power generating apparatus of claim 1 wherein the power generator further comprises a connector rod attached to the vertical support wherein the connector rod is operably attached to a hydraulic cylinder or a plurality of hydraulic cylinders which store a quantity of hydraulic fluid under pressure in an accumulator reservoir as the connector rod moves upward relative to the horizontal ground in response to the airfoil moving from the rest position.

7. The power generating apparatus of claim 6 wherein the hydraulic cylinder or hydraulic cylinders are attached to a hydraulic electrical generator and wherein the quantity of hydraulic fluid is released to power the hydraulic electrical generator when an optimum pressure level is achieved.

8. The power generating apparatus of claim 1 further comprising a horizontal stabilizer connected to the trailing edge of the airfoil.

9. The power generating apparatus of claim 1 wherein the airfoil is adapted to achieve maximum power at an 18 degree limit above the horizontal relative to horizontal ground.

10. The power generating apparatus of claim 9 further comprising a power cycle wherein in the presence of wind the airfoil pivots upward from the rest position until it reaches 18 degrees above the horizontal relative to horizontal ground at which point the airfoil stalls and returns to the rest position.

11. The power generating apparatus of claim 9 further comprising a shroud connected to the leading edge of the airfoil, the shroud being configured to physically interrupt the wind flow as the airfoil approaches 18 degrees.

12. The power generating apparatus of claim 9 further comprising a mechanical shroud comprising a lever connected to the leading edge of the airfoil and a shroud connected to the lever wherein the mechanical shroud is configured such that as the airfoil rises, the mechanical shroud lowers the lever causing the shroud to fall estopping rise of the airfoil beyond the 18 degree limit.

13. The power generating apparatus of claim 1 wherein the top surface of the airfoil is constructed from a plurality of photovoltaic cells.

14. The power generating apparatus of claim 1 wherein the base is attached to a movable vehicle.

15. The power generating apparatus of claim 1 wherein the base is attached to a building.

16. The power generating apparatus of claim 1 wherein the airfoil is configured to operate under a body of water and the base is attached to the bed of the body of water.

17. The power generating apparatus of claim 1 wherein the apparatus is positioned downstream from a horizontal axis wind turbine.

18. A power generating apparatus adapted for utilizing fluid flow comprising:
  a. an airfoil having a rounded leading edge and a sharp trailing edge pivotally connected to a rigid vertical support at a point between the rounded leading edge and the sharp trailing edge and biased in a rest position that is substantially horizontal relative level ground when no wind is present such that upon intermittent winds contacting the airfoil, the leading edge of the airfoil pivots upward, from the rest position and in the absence of wind returns to the rest position;
  b. a base pivotally connected to the vertical support;
  c. a power generator carried by the base and adapted to actuate when the airfoil moves from the rest position in response to the gusty wind such that power is generated for use by a power consuming, a power storing, or a power transmitting device; and
  d. a power cycle wherein in the presence of wind the airfoil pivots upward from the rest position until it reaches 18 degrees above the horizontal relative to horizontal ground at which point the airfoil stalls and returns to the rest position.

19. The power generating apparatus of claim 18 wherein the vertical support comprises a telescoping function, biased in the rest position in the absence of gusty wind, and operating from the rest position to a fully extended position such that as wind contacts the airfoil, the airfoil lifts upward extending the vertical support toward the fully extended position and in the absence of gusty wind the vertical support returns to the rest position.

20. The power generating apparatus of claim 19 wherein the base further comprises a turntable and a wind vane is attached to the vertical support, the turntable and the wind vane operating to ensure that the airfoil faces the optimum direction for harvesting gusty winds.

21. The power generating apparatus of claim 19 wherein signage is attached to the vertical support and signage comprises a plurality of individual signs such that as the vertical support moves from the rest position to the fully extended position the individual signs are visible.

22. The power generating apparatus of claim 18 wherein the power generator further comprises a connector rod attached to the vertical support wherein the connector rod is also connected to a flywheel attached to a crankshaft that is operably connected to a permanent-magnet alternator that generates electrical power as the shaft rotates, the crankshaft rotating as the connector rod moves upward relative to the horizontal ground in response to the airfoil moving from the rest position.

23. The power generating apparatus of claim 18 wherein the power generator further comprises a connector rod attached to the vertical support wherein the connector rod is operably attached to a hydraulic cylinder or a plurality of hydraulic cylinders which store a quantity of hydraulic fluid under pressure in an accumulator reservoir as the connector rod moves upward relative to the horizontal ground in response to the airfoil moving from the rest position.

24. The power generating apparatus of claim 18 further comprising a horizontal stabilizer connected to the trailing edge of the airfoil.

25. The power generating apparatus of claim 18 further comprising a shroud connected to the leading edge of the airfoil, the shroud being configured to physically interrupt the wind flow as the airfoil approaches 18 degrees.

26. The power generating apparatus of claim 18 further comprising a mechanical shroud comprising a lever connected to the leading edge of the airfoil and a shroud connected to the lever wherein the mechanical shroud is configured such that as the airfoil rises, the mechanical shroud lowers the lever causing the shroud to fall estopping rise of the airfoil beyond the 18 degree limit.

27. The power generating apparatus of claim 18 wherein the top surface of the airfoil is constructed from a plurality of photovoltaic cells.

28. The power generating apparatus of claim 18 wherein the base is attached to a movable vehicle.

29. The power generating apparatus of claim 18 wherein the base is attached to a building.

30. The power generating apparatus of claim 18 wherein the airfoil is configured to operate under a body of water and the base is attached to the bed of the body of water.

* * * * *